(12) United States Patent
Aoki et al.

(10) Patent No.: US 9,620,797 B2
(45) Date of Patent: Apr. 11, 2017

(54) WET STATE CONTROL DEVICE FOR FUEL CELL

(75) Inventors: Tetsuya Aoki, Yokosuka (JP); Michihiko Matsumoto, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 515 days.

(21) Appl. No.: 14/123,868

(22) PCT Filed: Apr. 19, 2012

(86) PCT No.: PCT/JP2012/060572
§ 371 (c)(1),
(2), (4) Date: Dec. 4, 2013

(87) PCT Pub. No.: WO2012/169287
PCT Pub. Date: Dec. 13, 2012

(65) Prior Publication Data
US 2014/0093796 A1 Apr. 3, 2014

(30) Foreign Application Priority Data

Jun. 6, 2011 (JP) ................................. 2011-126109
Jul. 28, 2011 (JP) ................................. 2011-165322

(51) Int. Cl.
| | |
|---|---|
| *H01M 8/04* | (2016.01) |
| *H01M 8/10* | (2016.01) |
| *H01M 8/04119* | (2016.01) |
| *H01M 8/04701* | (2016.01) |
| *H01M 8/04746* | (2016.01) |
| *H01M 8/04828* | (2016.01) |
| *H01M 8/0432* | (2016.01) |
| *H01M 8/0438* | (2016.01) |

(Continued)

(52) U.S. Cl.
CPC ... *H01M 8/04119* (2013.01); *H01M 8/04029* (2013.01); *H01M 8/04358* (2013.01); *H01M 8/04395* (2013.01); *H01M 8/04723* (2013.01); *H01M 8/04753* (2013.01); *H01M 8/04828* (2013.01); *H01M 2008/1095* (2013.01)

(58) Field of Classification Search
CPC ......... H01M 8/04119; H01M 8/04723; H01M 8/04753; H01M 8/04395; H01M 8/04029
See application file for complete search history.

(56) References Cited

U.S. PATENT DOCUMENTS

| | | | | |
|---|---|---|---|---|
| 5,366,821 A | * | 11/1994 | Merritt | H01M 8/04 429/422 |
| 6,524,733 B1 | | 2/2003 | Nonobe | |
| 2002/0192520 A1 | * | 12/2002 | Nonobe | H01M 8/04119 429/413 |

FOREIGN PATENT DOCUMENTS

| | | |
|---|---|---|
| JP | 2000-243418 A | 9/2000 |
| JP | 2006-004819 A | 1/2006 |

(Continued)

*Primary Examiner* — Helen O Conley
(74) *Attorney, Agent, or Firm* — Foley & Lardner LLP

(57) ABSTRACT

A wet state control device for fuel cell includes a priority control unit for preferentially controlling either one of a pressure and a flow rate of cathode gas when a wet state of a fuel cell is adjusted, a water temperature control unit for controlling a temperature of cooling water when the wet state of the fuel cell is not completely adjustable by a control of the priority control unit, and a complementary control unit for controlling the other of the pressure and the flow rate of the cathode gas to complement a response delay of the water temperature control unit.

7 Claims, 22 Drawing Sheets

(51) Int. Cl.
*H01M 8/04029* (2016.01)
*H01M 8/1018* (2016.01)

(56) References Cited

FOREIGN PATENT DOCUMENTS

| | | |
|---|---|---|
| JP | 2006-351506 A | 12/2006 |
| JP | 2007-115488 A | 5/2007 |
| JP | 2007-123095 A | 5/2007 |
| JP | 2009-231225 A | 10/2009 |

* cited by examiner

WET STATE CONTROL DEVICE FOR FUEL CELL

TECHNICAL FIELD

This invention relates to a device for controlling a wet state of a fuel cell.

BACKGROUND ART

For efficient power generation of a fuel cell, it is important to maintain an electrolyte membrane in a suitable wet state. Specifically, if the electrolyte membrane is too wet, flooding occurs or a purge operation at stoppage is necessary in preparation for sub-zero start-up. Further, if the electrolyte membrane is insufficiently wet, a voltage of a fuel cell stack may drop and an output may be largely reduced. Accordingly, in JP2007-115488A issued by the Japan Patent Office in 2007, a pressure regulating valve and a cathode compressor are controlled to set such cathode gas pressure and cathode gas flow rate that an electrolyte membrane is maintained in a suitable wet state. Particularly in the case of controlling to make the electrolyte membrane wetter in consideration of fuel economy, a rotation speed is first reduced to lower power consumption of the cathode compressor and then the pressure regulating valve is closed to increase the pressure.

SUMMARY OF INVENTION

Cooling water temperature is one of parameters for controlling a degree of wetness. However, the cooling water temperature is not controlled to regulate wetness in the aforementioned technique. Thus, the present inventors found that there was room for improvement of fuel economy in a wetness control in transition.

The present invention was developed in view of such a conventional problem. The present invention aims to provide a wet state control device for fuel cell capable of maintaining an electrolyte membrane in a suitable wet state while suppressing the deterioration of fuel economy including a cooling water control.

A wet state control device for fuel cell according to a certain embodiment of the present invention includes a priority control unit for preferentially controlling either one of a pressure and a flow rate of cathode gas when a wet state of a fuel cell is adjusted, a water temperature control unit for controlling a temperature of cooling water when the wet state of the fuel cell is not completely adjustable by a control of the priority control unit, and a complementary control unit for controlling the other of the pressure and the flow rate of the cathode gas to complement a response delay of the water temperature control unit.

Embodiments of the present invention and advantages thereof are described in detail below in conjunction with the accompanying drawings.

DESCRIPTION OF EMBODIMENTS

First Embodiment

Figure 1:
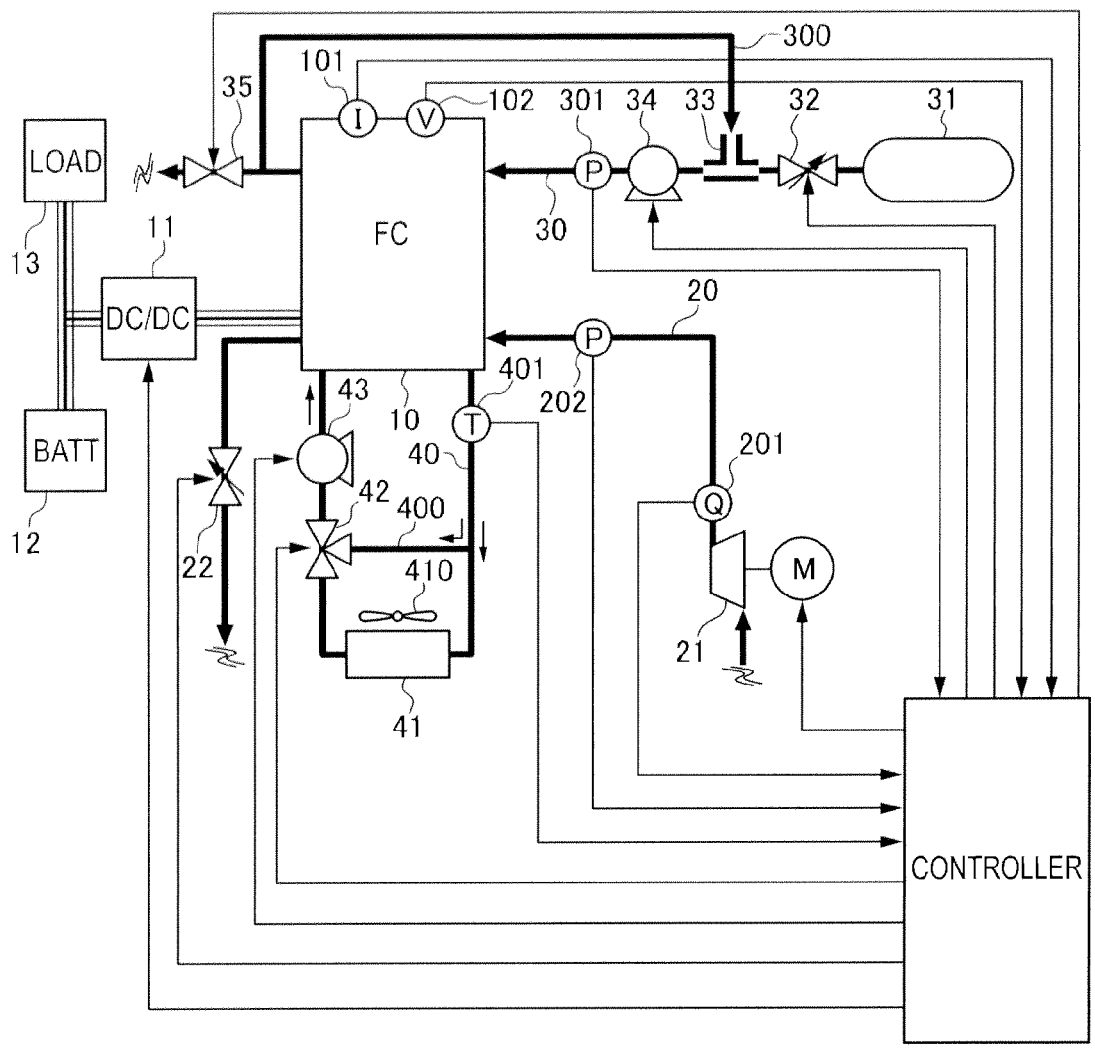
FIG. 1 is a diagram showing an example of a system to which a wet state control device for fuel cell according to the present invention is applied.

FIG. 1 is a diagram showing an example of a system to which a wet state control device for fuel cell according to the present invention is applied.

First, a basic system to which the wet state control device for fuel cell according to the present invention is applied is described with reference to FIG. 1.

A fuel cell stack 10 generates power by being supplied with reaction gas (cathode gas $O_2$, anode gas $H_2$) while being maintained at a suitable temperature. Accordingly, a cathode line 20, an anode line 30 and a cooling water circulation line 40 are connected to the fuel cell stack 10. It should be noted that a power generation current of the fuel cell stack 10 is detected by a current sensor 101. A power generation voltage of the fuel cell stack 10 is detected by a voltage sensor 102.

Cathode gas $O_2$ to be supplied to the fuel cell stack 10 flows in the cathode line 20. A compressor 21 and a cathode pressure regulating valve 22 are provided in the cathode line 20.

The compressor 21 supplies the cathode gas $O_2$, i.e. air to the fuel cell stack 10. The compressor 21 is provided upstream of the fuel cell stack 10 in the cathode line 20. The compressor 21 is driven by a motor M. The compressor 21 regulates a flow rate of the cathode gas $O_2$ flowing in the cathode line 20. The flow rate of the cathode gas $O_2$ is regulated by the rotation speed of the compressor 21.

The cathode pressure regulating valve 22 is provided downstream of the fuel cell stack 10 in the cathode line 20. The cathode pressure regulating valve 22 regulates a pressure of the cathode gas $O_2$ flowing in the cathode line 20. The pressure of the cathode gas $O_2$ is regulated by an opening of the cathode pressure regulating valve 22.

The flow rate of the cathode gas $O_2$ flowing in the cathode line 20 is detected by a cathode flow rate sensor 201. This cathode flow rate sensor 201 is provided downstream of the compressor 21 and upstream of the fuel cell stack 10.

The pressure of the cathode gas $O_2$ flowing in the cathode line 20 is detected by a cathode pressure sensor 202. This cathode pressure sensor 202 is provided downstream of the compressor 21 and upstream of the fuel cell stack 10. Further, in FIG. 1, the cathode pressure sensor 202 is located downstream of the cathode flow rate sensor 201.

The anode gas $H_2$ to be supplied to the fuel cell stack 10 flows in the anode line 30. An anode recirculation line 300 is arranged in parallel to the anode line 30. The anode recirculation line 300 is branched off from the anode line 30 at a side downstream of the fuel cell stack 10 and joins the anode line 30 at a side upstream of the fuel cell stack 10. A bomb 31, an anode pressure regulating valve 32, an ejector 33, an anode pump 34 and a purge valve 35 are provided in the anode line 30.

The anode gas $H_2$ is stored in a high pressure state in the bomb 31. The bomb 31 is provided at a most upstream side of the anode line 30.

The anode pressure regulating valve 32 is provided downstream of the bomb 31. The anode pressure regulating valve 32 regulates a pressure of the anode gas $H_2$ to be newly supplied from the bomb 31 to the anode line 30. The pressure of the anode gas $H_2$ is regulated by an opening of the anode pressure regulating valve 32.

The ejector 33 is provided downstream of the anode pressure regulating valve 32. The ejector 33 is located at a position where the anode recirculation line 300 joins the anode line 30. The anode gas $H_2$ having flowed in the anode recirculation line 300 is mixed with the anode gas $H_2$ newly supplied from the bomb 31 by this ejector 33.

The anode pump 34 is located downstream of the ejector 33. The anode pump 34 feeds the anode gas $H_2$ having flowed through the ejector 33 to the fuel cell stack 10.

The purge valve 35 is provided downstream of the fuel cell stack 10 in a side of the anode line 30 downstream of a position where the anode recirculation line 300 is branched off. When the purge valve 35 is opened, the anode gas $H_2$ is purged.

A pressure of the anode gas $H_2$ flowing in the anode line 30 is detected by an anode pressure sensor 301. This anode pressure sensor 301 is provided downstream of the anode pump 34 and upstream of the fuel cell stack 10.

Cooling water to be supplied to the fuel cell stack 10 flows in the cooling water circulation line 40. A radiator 41, a three-way valve 42 and a water pump 43 are provided in the cooling water circulation line 40. Further, a bypass line 400 is arranged in parallel to the cooling water circulation line 40. The bypass line 400 is branched off at a side upstream of the radiator 41 and joins at a side downstream of the radiator 41. Thus, the cooling water flowing in the bypass line 400 bypasses the radiator 41.

The radiator 41 cools the cooling water. The radiator 41 is provided with a cooling fan 410.

The three-way valve 42 is located at a position where the bypass line 400 joins the cooling water circulation line 40. The three-way valve 42 regulates a flow rate of the cooling water flowing in a radiator side line and that of the cooling water flowing in the bypass line. In this way, the temperature of the cooling water is regulated.

The water pump 43 is located downstream of the three-way valve 42. The water pump 43 feeds the cooling water having flowed through the three-way valve 42 to the fuel cell stack 10.

The temperature of the cooling water flowing in the cooling water circulation line 40 is detected by a water temperature sensor 401. This water temperature sensor 401 is provided upstream of a position where the bypass line 400 is branched off.

To a controller are input signals of the current sensor 101, the pressure sensor 102, the cathode flow rate sensor 201, the cathode pressure sensor 202, the anode pressure sensor 301 and the water temperature sensor 401. Then, the controller outputs signals to control the operations of the compressor 21, the cathode pressure regulating valve 22, the anode pressure regulating valve 32, the anode pump 34, the purge valve 35, the three-way valve 42 and the water pump 43.

By such a configuration, the fuel cell stack 10 generates power by being supplied with reaction gas (cathode gas $O_2$, anode gas $H_2$) while being maintained at a suitable temperature. The power generated by the fuel cell stack 10 is supplied to a battery 12 and a load 13 via a DC/DC converter 11.

Figure 2A:
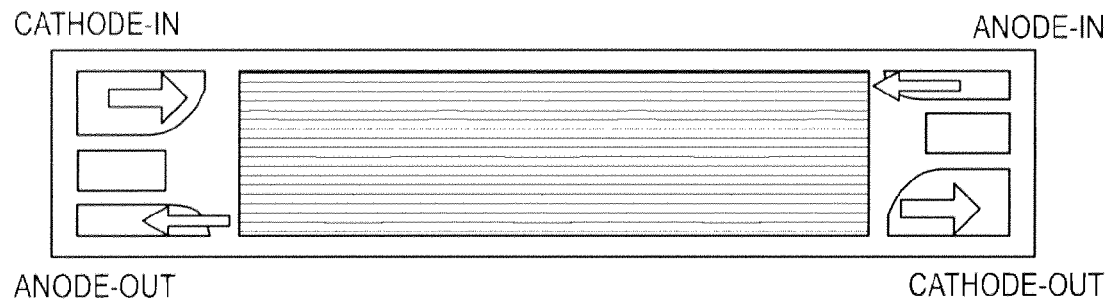
FIG. 2A is a schematic diagram showing a reaction of an electrolyte membrane in a fuel cell stack.
Figure 2B:
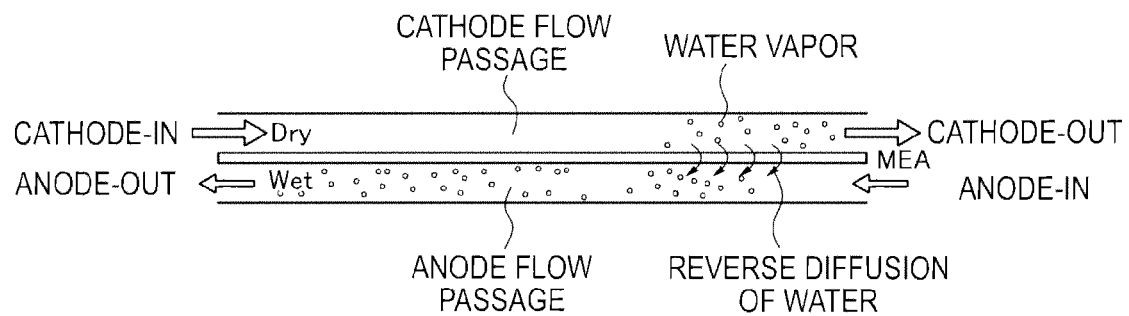
FIG. 2B is a schematic diagram showing the reaction of the electrolyte membrane in the fuel cell stack.

FIGS. 2A and 2B are schematic diagrams showing reactions of an electrolyte membrane in the fuel cell stack.

Next, a technical idea of the inventors is described with reference to FIGS. 2A and 2B.

As described above, the fuel cell stack 10 generates power by being supplied with reaction gas (cathode gas $O_2$, anode gas $H_2$). The fuel cell stack 10 is constructed by stacking several hundreds of membrane electrode assemblies (MEAs) each formed with a cathode electrode catalyst layer and an anode electrode catalyst layer on opposite surfaces of the electrolyte membrane. It should be noted that FIG. 2A shows one MEA. Here is shown an example in which cathode gas is supplied (cathode-in) and discharged from a diagonal side (cathode-out) while anode gas is supplied (anode-in) and discharged from a diagonal side (anode-out).

In each membrane electrode assembly (MEA), the following ions proceed according to a load in the cathode electrode catalyst layer and the anode electrode catalyst layer to generate power.

[Equations 1]

Cathode electrode catalyst layer: $4H^+ + 4e^- + O_2 \rightarrow 2H_2O$ (1-1)

Anode electrode catalyst layer: $2H_2 \rightarrow 4H^+ + 4e^-$ (1-2)

As shown in FIG. 2B, the reaction of the above Equation (1-1) proceeds and water vapor is produced as the reaction gas (cathode gas $O_2$) flows in a cathode flow passage. Then, relative humidity increases at a downstream side of the cathode flow passage. As a result, a relative humidity difference between a cathode side and an anode side becomes larger. Water reversely diffuses to humidify an upstream side of the anode using this relative humidity difference as a driving force. This moisture further evaporates from the MEA into the anode flow passage and humidifies the reaction gas (anode gas $H_2$) flowing in the anode flow passage. Then, the moisture is carried to a downstream side of the anode to humidify the MEA downstream of the anode.

To efficiently generate power by the above reactions, it is necessary for the electrolyte membrane to be in a suitable wet state.

Accordingly, the present inventors focused attention on the flow rate and the pressure of the cathode gas $O_2$ and the temperature of the fuel cell stack 10.

Specifically, if the flow rate of the cathode gas $O_2$ is increased, the moisture discharged together with the cathode gas $O_2$ increases. Accordingly, the wet state of the electrolyte membrane can be decreased. On the other hand, if the flow rate of the cathode gas $O_2$ is decreased, the moisture discharged together with the cathode gas $O_2$ decreases. Accordingly, the wet state of the electrolyte membrane can be increased.

The pressure of the cathode gas $O_2$ decreases when the opening of the cathode pressure regulating valve 22 increases. Accordingly, if the pressure of the cathode gas $O_2$ is decreased by increasing the opening of the cathode pressure regulating valve 22, the cathode gas $O_2$ is more easily discharged. As a result, the moisture discharged together with the cathode gas $O_2$ also increases. Thus, the wet state of the electrolyte membrane can be decreased. On the other hand, the pressure of the cathode gas $O_2$ increases when the opening of the cathode pressure regulating valve 22 decreases. Accordingly, if the pressure of the cathode gas $O_2$ is increased by decreasing the opening of the cathode pressure regulating valve 22, the cathode gas $O_2$ becomes hard to discharge. As a result, the moisture discharged together with the cathode gas $O_2$ also decreases. Thus, the wet state of the electrolyte membrane can be increased.

If the temperature of the fuel cell stack 10 increases, the moisture included in the cathode gas $O_2$ increases. As a result, the moisture discharged together with the cathode gas $O_2$ also increases. Thus, the wet state of the electrolyte membrane can be decreased. On the other hand, if the temperature of the fuel cell stack 10 decreases, the moisture included in the cathode gas $O_2$ decreases. As a result, the moisture discharged together with the cathode gas $O_2$ also decreases. Thus, the wet state of the electrolyte membrane can be increased.

The inventors obtained such knowledge. Further, if the rotation speed of the compressor 21 is increased to increase the flow rate of the cathode gas $O_2$, power consumption increases to deteriorate fuel economy. Accordingly, it is desirable to suppress the rotation speed of the compressor 21 as low as possible. The inventors have completed the present invention based on such an idea. Specific contents are described below.

Figure 3:
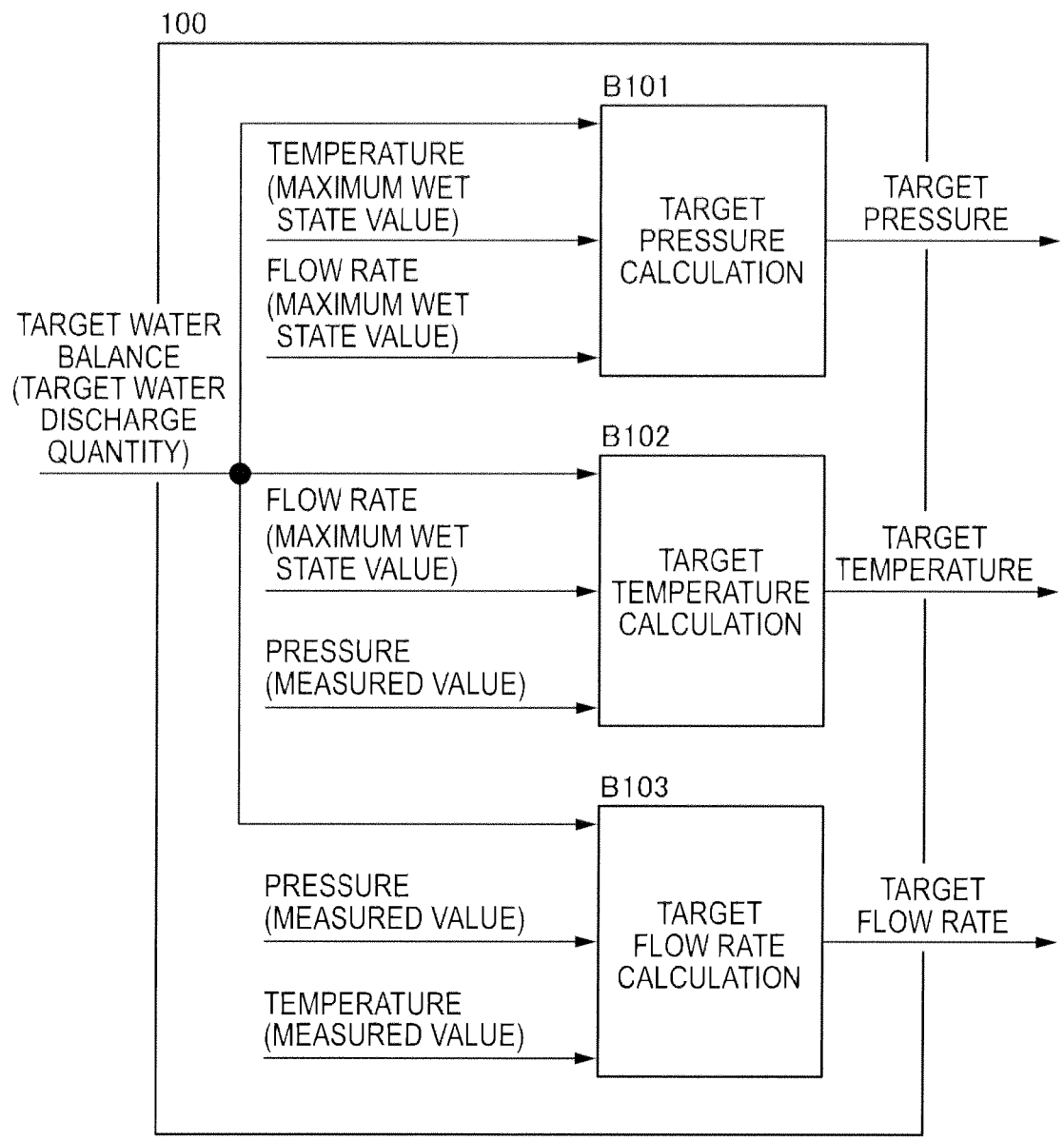
FIG. 3 is a block diagram showing functions relating to a wet state control of a controller when a target wet state decreases, FIG. 4 are timing charts showing the operation of the wet state control device when the target wet state decreases, FIG. 5 are charts showing a problem during execution of the above control logic when the target wet state increases.

FIG. 3 is a block diagram showing functions relating to a wet state control of the controller when a target wet state decreases.

It should be noted that each block shown in the block diagram shows each function of the controller as a virtual unit and does not mean physical existence.

The wet state control device controls the wet state of the electrolyte membrane of the fuel cell stack 10 by controlling the operations of the compressor 21, the cathode pressure regulating valve 22, the anode pressure regulating valve 32, the anode pump 34, the purge valve 35, the three-way valve 42 and the water pump 43. Specifically, the wet state control device includes a target pressure calculation block B101, a target temperature calculation block B102 and a target flow rate calculation block B103. It should be noted that, in the present embodiment, the target pressure calculation block B101 corresponds to a priority control unit as claimed, the target temperature calculation block B102 corresponds to a water temperature control unit as claimed and the target flow rate calculation block B103 corresponds to a complementary control unit as claimed.

The target pressure calculation block B101 calculates a target pressure $P_{target}$ based on a target water discharge quantity $Q_{H2O\_out}$, a minimum stack temperature $T_{min}$ and a minimum cathode flow rate $Q_{min}$ when the target water discharge quantity $Q_{H2O\_out}$ increases, i.e. at the time of drying by decreasing the wet state.

It should be noted that the target water discharge quantity $Q_{H2O\_out}$ [NL/min] is calculated by the following Equation (2). Here NL denotes normal liter, i.e. liter in a normal state.

[Equation 2]

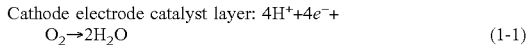

$$Q_{H2O\_out} = Q_{H2O\_in} - Q_{net\_water} \quad (2)$$

where:
$Q_{H2O\_out}$: target water discharge quantity [NL/min]
$Q_{H2O\_in}$: quantity of water produced in fuel cell [NL/min]
$Q_{net\_water}$: target water balance [NL/min]

It should be noted that the quantity $Q_{H2O\_in}$ of water produced in fuel cell [NL/min] is calculated by the following Equation (3).

[Equation 3]

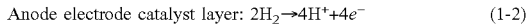

$$Q_{H2O\_in} = \frac{NI}{2F} \times 22.4 \times 60 \quad (3)$$

where:
N: number of cells of fuel cell
I: output current [I] of fuel cell
F: Faraday constant (96485.39 [C/mol]
22.4: volume [NL] of 1 mol of ideal gas in normal state
60: unit conversion coefficient between second and minute The target water balance $Q_{net\_water}$ [NL/min] is set to realize the target wet state of the electrolyte membrane determined according to an operating state (load state) of the fuel cell.

The target pressure calculation block B101 calculates the target pressure $P_{target}$ based on the thus obtained target water discharge quantity $Q_{H2O\_out}$, the minimum stack temperature $T_{min}$ and the minimum cathode flow rate $Q_{min}$. Specifically, the target pressure $P_{target}$ is calculated by the following Equations (4-1), (4-2).

[Equations 4]

$$P_{target} = P_{sat\_min} \frac{Q_{min} + Q_{H2O\_out}}{Q_{H2O\_out}} \quad (4\text{-}1)$$

where $$P_{sat\_min} = 10^{7.7406 - \frac{1657.46}{227.02 + T_{min}}} \quad (4\text{-}2)$$

Here, the minimum stack temperature $T_{min}$ is a stack temperature at the time of setting the fuel cell stack in a maximum wet state. As described above, the temperature of the fuel cell stack 10 is decreased to increase the wet state of the electrolyte membrane. It should be noted that a power generation failure may be caused by condensed water if the temperature of the fuel cell stack 10 is too low. On the other hand, if this temperature is too high, the deterioration of the fuel cell stack 10 is accelerated. Thus, the stack temperature at the time of setting the fuel cell stack in the maximum wet state is a lowest stack temperature in a range where the performance of the fuel cell stack can be ensured, comprehensively considering these. Similarly, the minimum cathode flow rate $Q_{min}$ is a cathode flow rate at the time of setting the fuel cell stack in the maximum wet state. As described above, the cathode flow rate is decreased to increase the wet state of the electrolyte membrane. It should be noted that a power generation failure may be caused by an insufficient supply amount if the cathode flow rate is too low. On the other hand, if the cathode flow rate is too high, sound vibration performance may be decelerated. Thus, the cathode flow rate at the time of setting the fuel cell stack in a maximum wet state is a lowest cathode flow rate in a range where the performance of the fuel cell stack can be ensured, comprehensively considering these. These are set according to the operating state of the fuel cell by an experiment in advance.

Further, $P_{sat\_min}$ denotes a saturated water vapor pressure at the minimum stack temperature $T_{min}$ and the above Equation (4-2) is obtained based on Antoine equation.

In the above manner, the target pressure calculation block B101 calculates the target pressure $P_{target}$ based on the target water discharge quantity $Q_{H2O\_out}$, the minimum stack temperature $T_{min}$ and the minimum cathode flow rate $Q_{min}$ when the target water discharge quantity $Q_{H2O\_out}$ increases, i.e. at the time of drying by decreasing the wet state.

The target temperature calculation block B102 calculates a target temperature $T_{target}$ based on the target water discharge quantity $Q_{H2O\_out}$, a pressure $P_{sens}$ detected by the cathode pressure sensor 202 and the minimum cathode flow rate $Q_{min}$. Specifically, the target temperature $T_{target}$ is calculated by the following Equations (5-1), (5-2). It should be noted that Equation (5-1) is obtained by the reverse of Antoine equation.

[Equations 5]

$$T_{target} = \frac{1657.46}{7.7406 - \log_{10} P_{sat\_target}} - 227.02 \quad (5\text{-}1)$$

where:

$$P_{sat\_target} = P_{sens} \frac{Q_{H2O\_out}}{Q_{min} + Q_{H2O\_out}} \quad (5\text{-}2)$$

$P_{sat\_target}$ is a target saturated water vapor pressure. It should be noted that although the pressure $P_{sens}$ is detected by the cathode pressure sensor 202, a pressure loss of the fuel cell stack may be obtained by an experiment in advance and the pressure $P_{sens}$ may be estimated based on that.

In the above manner, the target temperature calculation block B102 calculates the target temperature $T_{target}$ based on the target water discharge quantity $Q_{H2O\_out}$, the actual pressure $P_{sens}$ and the minimum cathode flow rate $Q_{min}$.

The target flow rate calculation block B103 calculates a target cathode flow rate $Q_{target}$ based on the target water discharge quantity $Q_{H2O\_out}$, the pressure $P_{sens}$ detected by the cathode pressure sensor 202 and a water temperature $T_{sens}$ detected by the water temperature sensor 401. Specifically, the target cathode flow rate $Q_{target}$ is calculated by the following Equations (6-1), (6-2).

[Equations 6]

$$Q_{target} = Q_{H2O\_out} \frac{P_{sens} - P_{sat\_sens}}{P_{sat\_sens}} \quad (6\text{-}1)$$

where:

$$P_{sat\_sens} = 10^{7.7406 - \frac{1657.46}{227.02 + T_{sens}}} \quad (6\text{-}2)$$

$P_{sat\_sens}$ is a saturated water vapor pressure at the water temperature $T_{sens}$ detected by the water temperature sensor 401.

In the above manner, the target flow rate calculation block B103 calculates the target cathode flow rate $Q_{target}$ based on the target water discharge quantity $Q_{H2O\_out}$, the actual pressure $P_{sens}$ and the actual water temperature $T_{sens}$.

Figure 4:
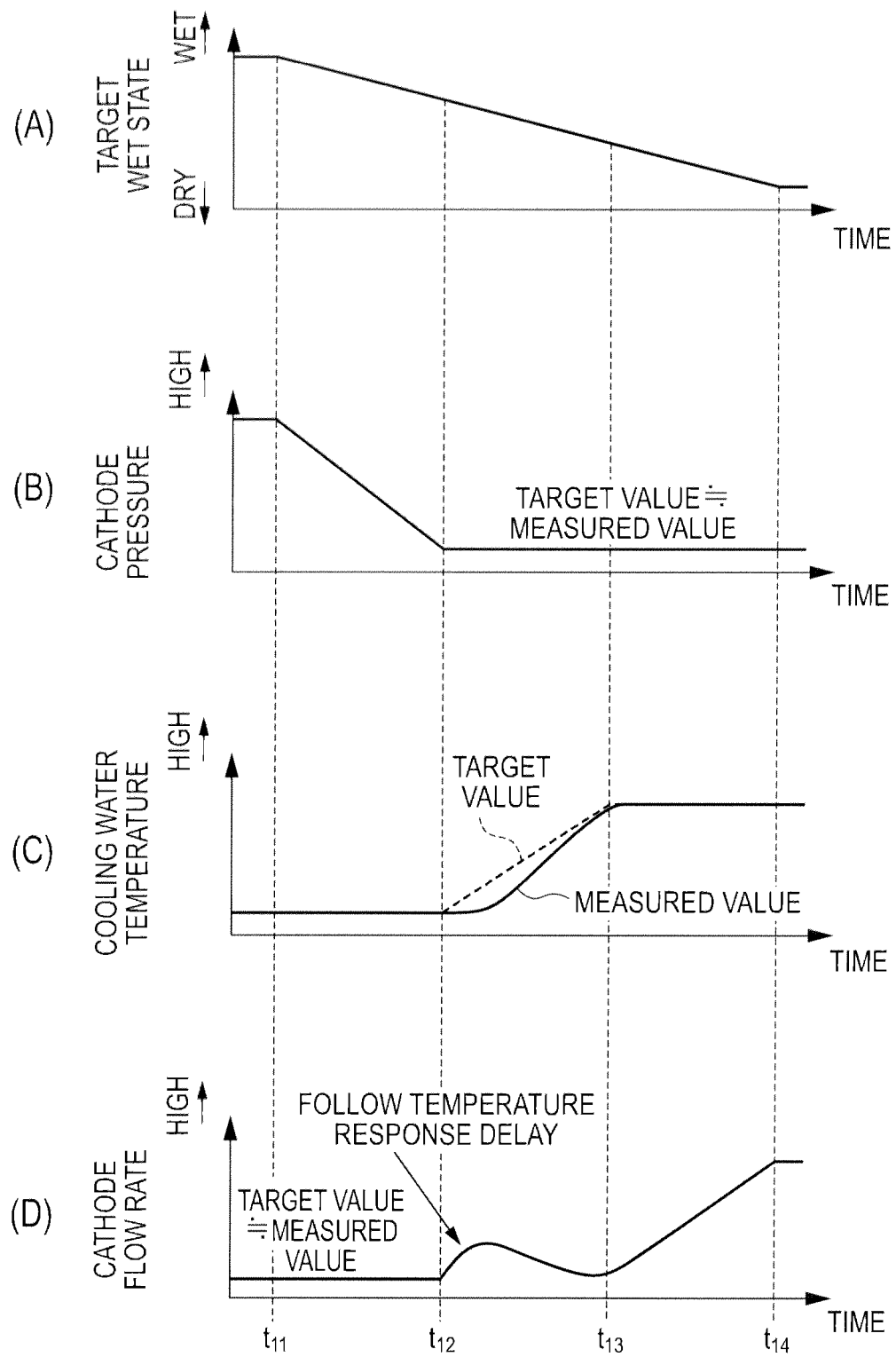

FIG. 4 are timing charts showing the operation of the wet state control device when the target wet state decreases.

When the above control logic is executed, the wet state control device operates as follows when the target wet state decreases.

When the target wet state decreases at time t11, the wet state control device starts operating.

The target pressure $P_{target}$ is set based on the target water discharge quantity $Q_{H2O\_out}$, the minimum stack temperature $T_{min}$ and the minimum cathode flow rate $Q_{min}$. The target temperature $T_{target}$ is set based on the target water discharge quantity $Q_{H2O\_out}$, the actual pressure $P_{sens}$ and the minimum cathode flow rate $Q_{min}$. The target cathode flow rate $Q_{target}$ is set based on the target water discharge quantity $Q_{H2O\_out}$, the actual pressure $P_{sens}$ and the actual water temperature $T_{sens}$.

Since being set based on the stack temperature (minimum stack temperature $T_{min}$ and the cathode flow rate (minimum cathode flow rate $Q_{min}$) at the time of setting the maximum wet state, the target pressure $P_{target}$ is most likely to vary. Accordingly, the target pressure $P_{target}$ is first preferentially decreased. Then, the cathode pressure regulating valve 22 is controlled to realize this target pressure $P_{target}$. Then, the cathode pressure decreases almost without any response delay.

If a complete adjustment is not possible only by changing the target pressure $P_{target}$, the target temperature $T_{target}$ starts varying at time t12. Specifically, a limit value (minimum cathode flow rate $Q_{min}$) is used to set the target temperature $T_{target}$. Further, the sensor detection value $P_{sens}$ of the cathode pressure regulated as described above is fed back. Thus, an amount unadjustable only by the cathode pressure is adjusted by changing the temperature of the cooling water. It should be noted that the temperature of the cooling water is unlikely to vary and a response delay is likely to occur even if a target value is changed. Since the temperature of the cooling water is detected by the water temperature sensor 401 and fed back to determine the cathode flow rate, a response delay of the cooling water temperature is complemented by the cathode flow rate.

If a complete adjustment is not possible even if the target temperature $T_{target}$ is changed, the target cathode flow rate $Q_{target}$ starts varying at time t13. Specifically, since the pressure $P_{sens}$ detected by the cathode pressure sensor 202 and the water temperature $T_{sens}$ detected by the water temperature sensor 401 are fed back to determine the cathode flow rate, an amount unadjustable by changing the target pressure $P_{target}$ and the target temperature $T_{target}$ is complemented by the cathode flow rate.

By doing so, the target pressure is first decreased and the cathode pressure regulating valve 22 is opened when the target wet state decreases. Subsequently, the target cooling water temperature is increased and the three-way valve 42 is controlled. Finally, the target flow rate is increased and the rotation speed of the compressor 21 is increased. By doing so, an increase in the rotation speed of the compressor 21 is suppressed as much as possible. Although power consumption increases to deteriorate fuel economy with an increase in the rotation speed of the compressor, power consumption is suppressed to improve fuel economy in the present embodiment since an increase in the rotation speed of the compressor 21 is suppressed as much as possible.

Figure 5:
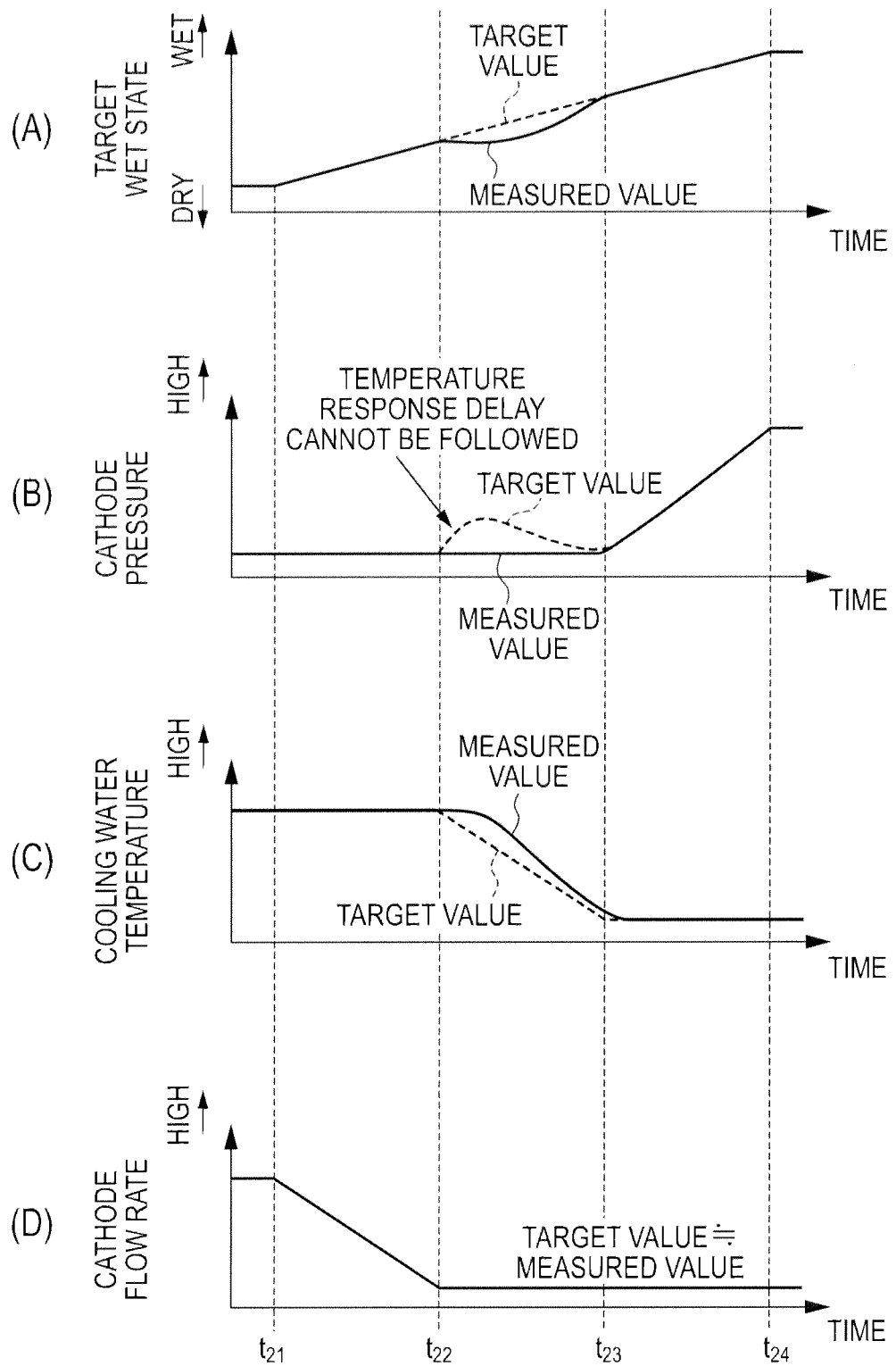

FIG. 5 are charts showing a problem during execution of the above control logic when the target wet state increases.

Since an increase in the rotation speed of the compressor 21 is suppressed as much as possible by doing as described above when the target wet state decreases, power consumption is suppressed to improve fuel economy.

However, it was found by the present inventors that the wet state cannot be controlled as targeted in the above manner when the target wet state increases. Specifically, since being set based on the stack temperature (minimum stack temperature $T_{min}$) and the cathode flow rate (minimum cathode flow rate at the time of setting the maximum wet state, the target pressure $P_{target}$ is unlikely to vary when the target wet state increases.

Thus, when the target wet state increases at time t21, the target cathode flow rate $Q_{target}$ first starts decreasing as shown in FIG. 5.

If a complete adjustment is not possible only by changing the target cathode flow rate $Q_{target}$, the target pressure $P_{target}$ and the target temperature $T_{target}$ start varying at time t22. Temperature has poor responsiveness and is less likely to vary than pressure. Conversely, pressure varies earlier than temperature and cannot complement temperature. Thus, temperature deviates from a target, with result that the wet state cannot be controlled as targeted.

Figure 6:
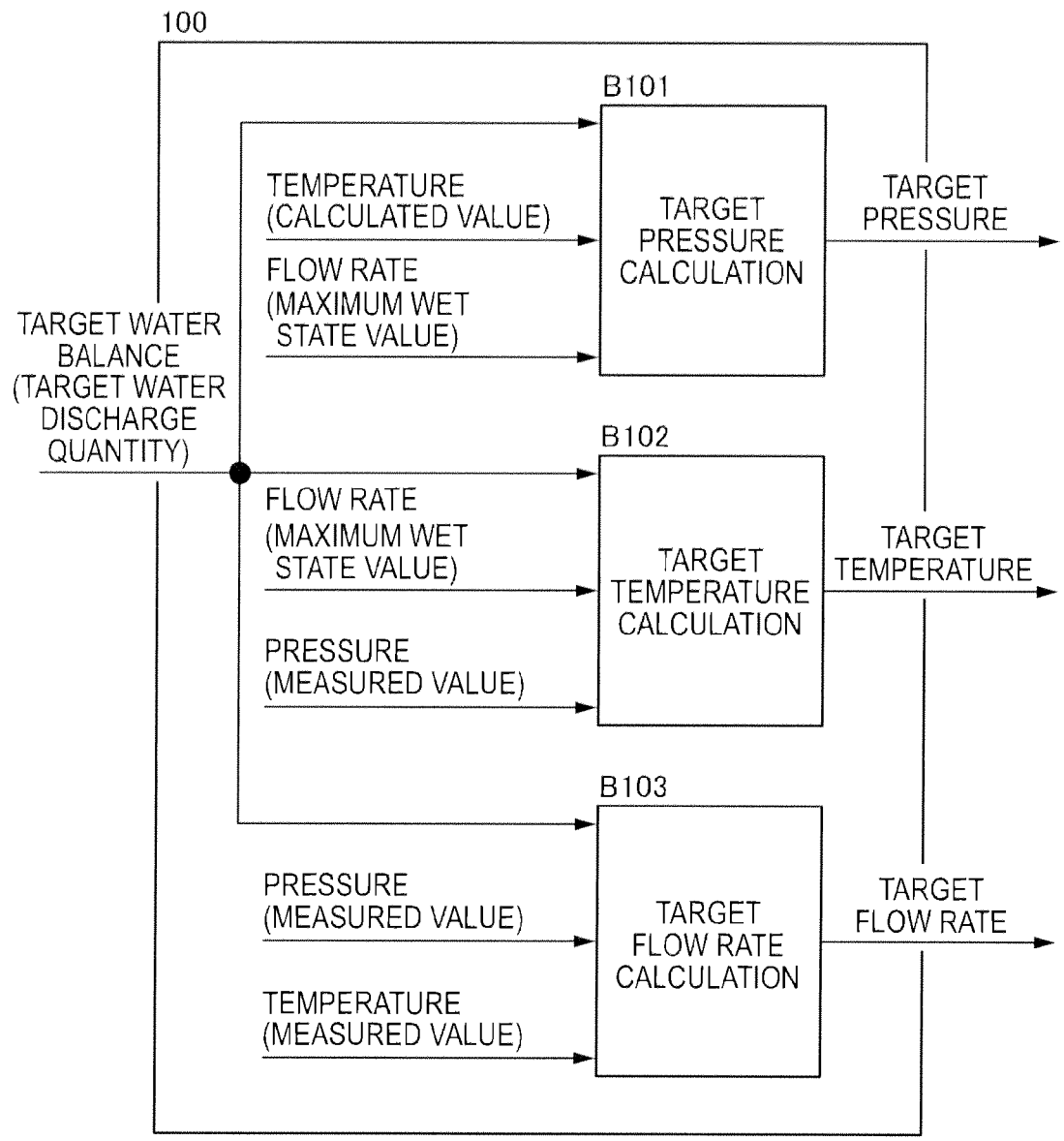
FIG. 6 is a block diagram showing functions relating to the wet state control of the controller when the target wet state increases.

FIG. 6 is a block diagram showing functions relating to the wet state control of the controller when the target wet state increases.

In FIG. 6, the target pressure calculation block B101 corresponds to the complementary control unit as claimed, the target temperature calculation block B102 corresponds to the water temperature control unit as claimed and the target flow rate calculation block B103 corresponds to the priority control unit as claimed.

As shown in FIG. 6, when the target wet state increases, a temperature (calculated value) calculated based on the stack temperature (minimum stack temperature $T_{min}$) at the time of setting the maximum wet state and higher than the minimum stack temperature $T_{min}$, but lower than the water temperature $T_{sens}$ detected by the water temperature sensor 401 is used.

This calculated value is specifically described.

In the present embodiment, attention is focused on a manipulation amount for manipulating the cooling water temperature and a temperature to be input to the target pressure calculation block B101 is calculated according to this manipulation amount.

The manipulation amount for manipulating the cooling water temperature is, for example, a rotation speed of the water pump 43.

With a decrease in the rotation speed of the water pump 43, the temperature of the fuel cell stack 10 increases since the flow rate of the cooling water is small. If the temperature of the fuel cell stack 10 increases, the amount of moisture contained in the cathode gas $O_2$ increases. As a result, the moisture discharged together with the cathode gas $O_2$ also increases. Thus, the wet state of the electrolyte membrane decreases to dry the electrolyte membrane.

Conversely, the more it is attempted to dry the electrolyte membrane by decreasing the wet state of the electrolyte membrane, the lower the rotation speed of the water pump 43 becomes. The more it is attempted to increase the wet state of the electrolyte membrane, the higher the rotation speed of the water pump 43 becomes.

Accordingly, the lower the rotation speed of the water pump 43, the more it is attempted to dry the electrolyte membrane by decreasing the wet state of the electrolyte membrane. If the rotation speed of the water pump 43 is minimum, it is attempted to drastically decrease the wet state of the electrolyte membrane. Thus, at this time, the stack temperature (minimum stack temperature $T_{min}$) at the time of setting the maximum wet state is used as described as the above control when the target wet state decreases.

On the other hand, the higher the rotation speed of the water pump 43 is, the more it is attempted to wet the electrolyte membrane by increasing the wet state of the electrolyte membrane. If the rotation speed of the water pump 43 is maximum, it is attempted to drastically increase the wet state of the electrolyte membrane. Thus, at this time, a temperature (calculated value) calculated based on the stack temperature (minimum stack temperature $T_{min}$) at the time of setting the maximum wet state and higher than the minimum stack temperature $T_{min}$, but lower than the water temperature $T_{sens}$ detected by the water temperature sensor 401 is used. It should be noted that this temperature constantly coincides with the water temperature $T_{sens}$ detected by the target wet state 401.

During that time, the temperature is calculated based on the rotation speed of the water pump 43. Specifically, a temperature $T_{coolant}$ is calculated in accordance with the following equation (7).

[Equation 7]

$$T_{coolant} = \frac{T_{sens} - T_{min}}{2} \times \frac{T_{pump\_target}}{R_{pump\_max}} + T_{min} \qquad (7)$$

where:

$R_{pump\_target}$: target rotation speed [rpm] of water pump 43
$R_{pump\_max}$: maximum rotation speed [rpm] of water pump 43

Figure 7:
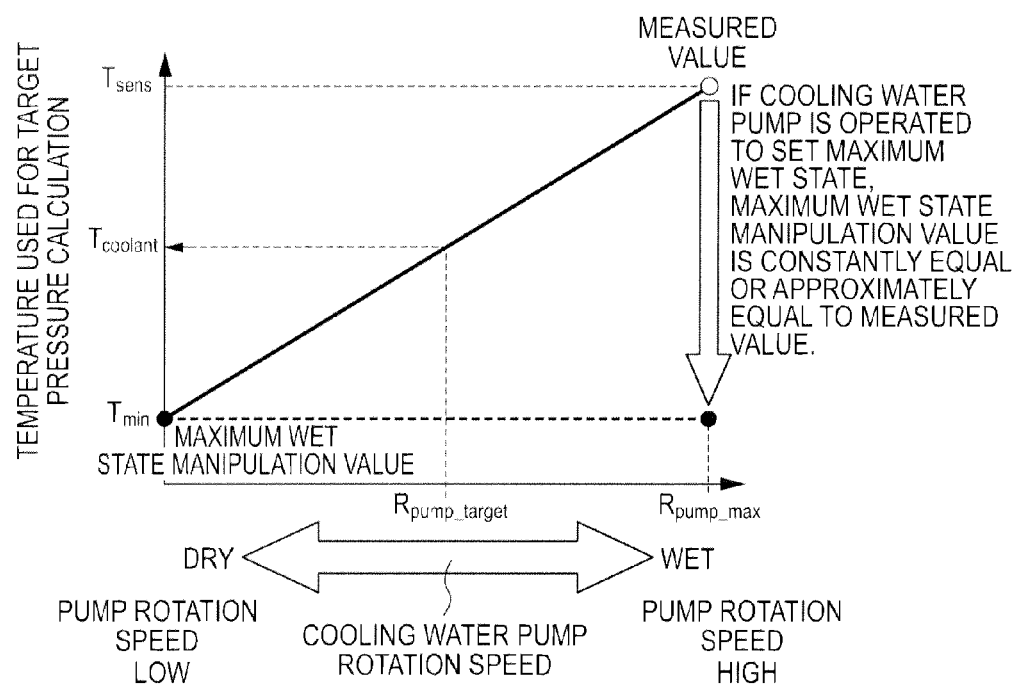
FIG. 7 is a graph showing temperature input to a target pressure calculation block B101 of the wet state control device for fuel cell according to the present invention, FIG. 8 are timing charts showing the operation of the wet state control device when the target wet state increases.

The temperature calculated in this way is shown in FIG. 7. Specifically, when it is attempted to dry the electrolyte membrane by decreasing the wet state of the electrolyte membrane, the stack temperature (minimum stack temperature $T_{min}$) at the time of setting the maximum wet state is used. When it is attempted to wet the electrolyte membrane by increasing the wet state of the electrolyte membrane, the temperature (calculated value) calculated based on the stack temperature (minimum stack temperature $T_{min}$) at the time of setting the maximum wet state and higher than the minimum stack temperature $T_{min}$, but lower than the water temperature $T_{sens}$ detected by the water temperature sensor 401 is used.

It should be noted that, as shown in FIG. 7, the temperature $T_{coolant}$ is calculated by connecting the minimum stack temperature $T_{min}$ and the water temperature $T_{sens}$ by a straight line and apportioning between the minimum stack temperature $T_{min}$ and the water temperature $T_{sens}$ in the above Equation (7). However, there is no limitation to such a technique. The minimum stack temperature $T_{min}$ and the water temperature $T_{sens}$ may be in a relationship connected by a downward convex curve such as an exponential function or may be in a relationship connected by an upward convex curve such as a log function instead of by a straight line. Such relationship should be set in advance. The temperature $T_{coolant}$ may be calculated based on these curves.

Figure 8:
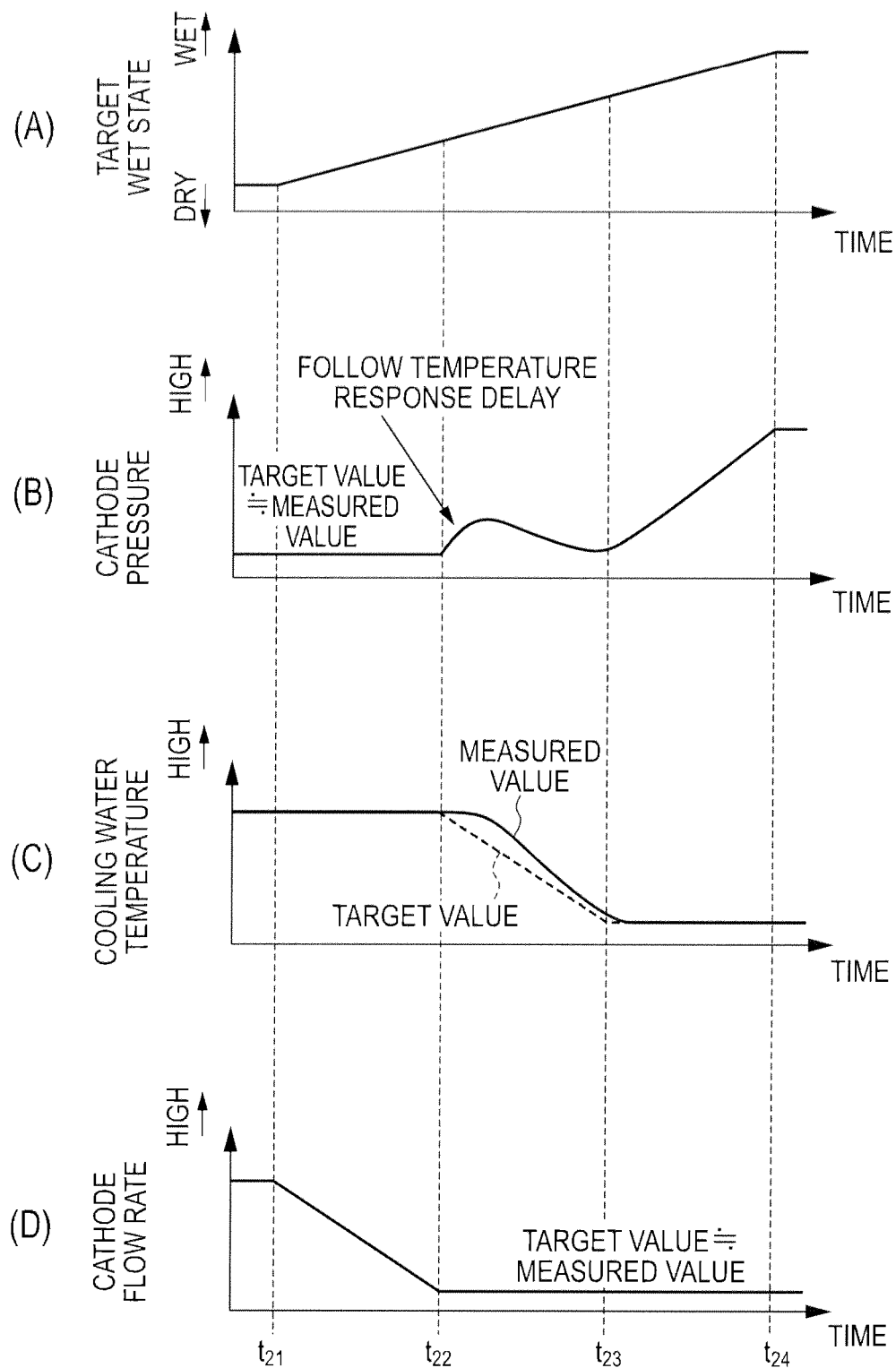

FIG. 8 are timing charts showing the operation of the wet state control device when the target wet state increases.

By this way, a temperature lower than the water temperature $T_{sens}$ detected by the water temperature sensor 401 is constantly input to the target pressure calculation block B101. Thus, the target wet state cannot be achieved at the pressure calculated in the target pressure calculation block B101. Thus, the target wet state is achieved at the temperature calculated by the target temperature calculation block B102 and the pressure is varied to complement that temperature.

By this way, the target wet state of the fuel cell is changed, and the target flow rate first decreases and the rotation speed of the compressor 21 decreases when the wet state is increased. Subsequently, the target cooling water temperature decreases and the three-way valve 42 is controlled. Finally, the target pressure increases and the cathode pressure regulating valve 22 is closed. By doing so, the rotation speed of the compressor 21 is reduced as early as possible. As described above, power consumption increases to deteriorate fuel economy with an increase in the rotation speed of the compressor. In other words, power consumption is suppressed to improve fuel economy with a decrease in the rotation speed of the compressor. Since the rotation speed of the compressor 21 is reduced as early as possible in the present embodiment, fuel economy is improved.

Further, since the temperature input to the target pressure calculation block B101 is not suddenly switched depending on whether or not the target wet state decreases or increases, it can be avoided that the control becomes unstable.

Second Embodiment

Figure 9A:
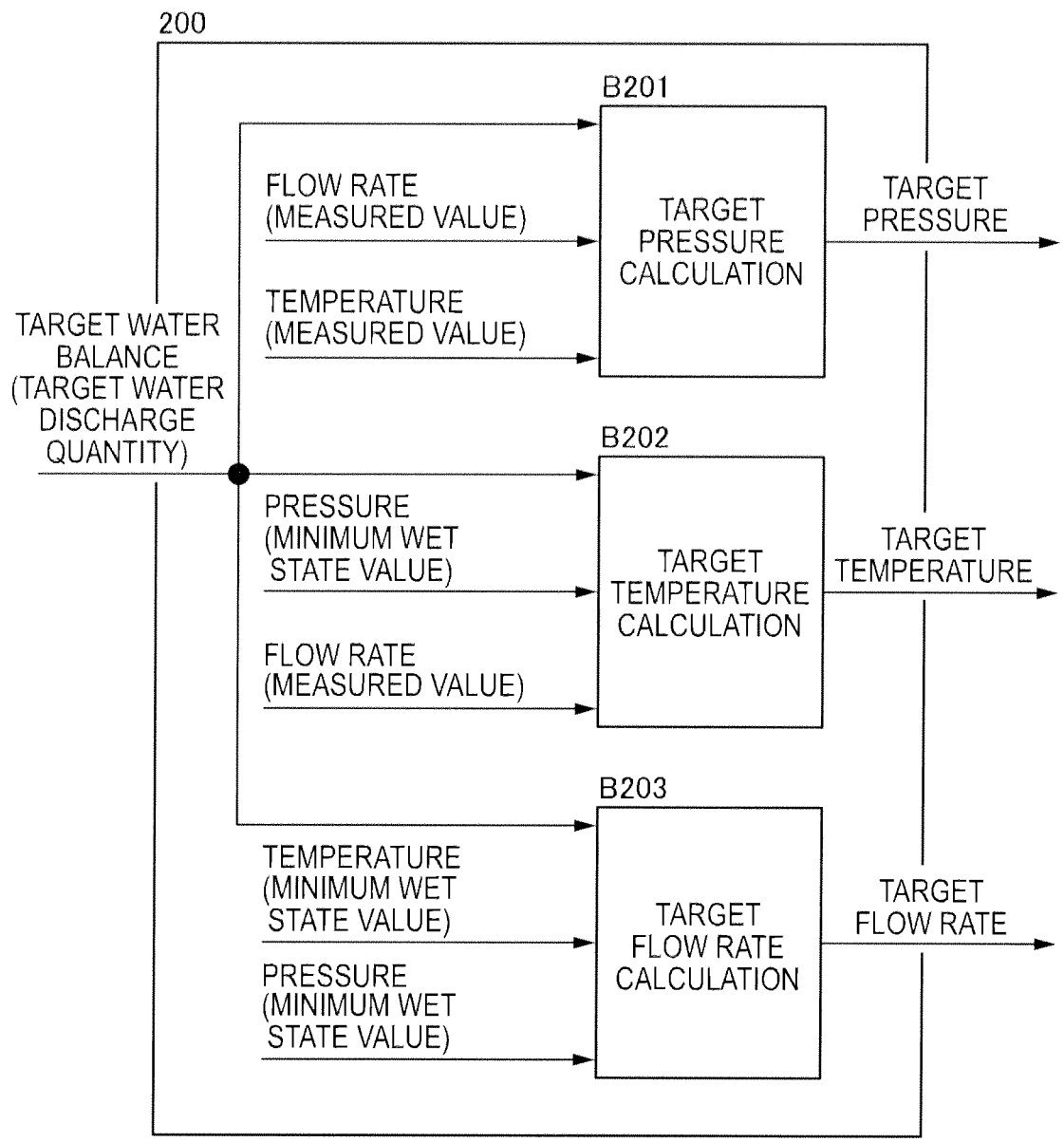
FIG. 9A is a block diagram showing functions relating to a wet state control of a controller of a second embodiment of a wet state control device for fuel cell according to the present invention.
Figure 9B:
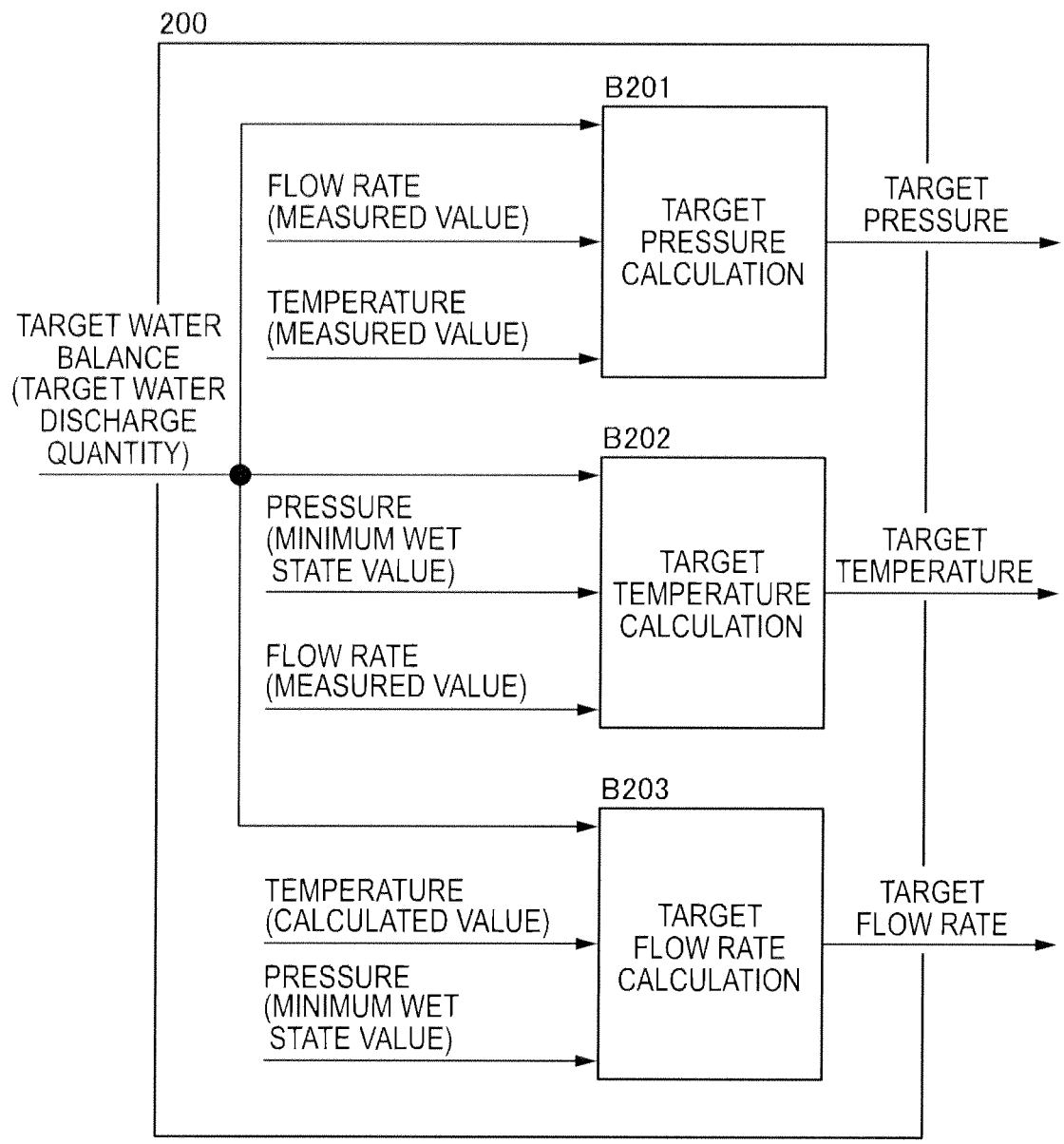
FIG. 9B is a block diagram showing functions relating to the wet state control of the controller of the second embodiment of the wet state control device for fuel cell according to the present invention, FIG. 10 are timing charts showing the operation of the wet state control device when a target wet state increases, FIG. 11 are timing charts showing the operation of the wet state control device when the target wet state decreases.

FIGS. 9A and 9B are block diagrams showing functions relating to a wet state control of a controller of a second embodiment of a wet state control device for fuel cell according to the present invention. FIG. 9A shows functions when a target wet state increases and FIG. 9B shows functions when the target wet state decreases.

The wet state control device of the present embodiment includes a target pressure calculation block B201, a target temperature calculation block B202 and a target flow rate calculation block B203.

It should be noted that, when the target wet state increases (FIG. 9A), the target pressure calculation block B201 corresponds to the complementary control unit as claimed, the target temperature calculation block B202 corresponds to the water temperature control unit as claimed and the target flow rate calculation block B203 corresponds to the priority control unit as claimed.

When the target wet state decreases (FIG. 9B), the target pressure calculation block B201 corresponds to the priority control unit as claimed, the target temperature calculation block B202 corresponds to the water temperature control unit as claimed, and the target flow rate calculation block B203 corresponds to the complementary control unit as claimed.

The target pressure calculation block B201 calculates a target cathode pressure $P_{target}$ based on a target water discharge quantity $Q_{H2O\_out}$, a flow rate $Q_{sens}$ detected by the cathode flow sensor 201 and a water temperature $T_{sens}$ detected by the water temperature sensor 401. Specifically, the target cathode pressure $P_{target}$ is calculated by the following Equations (8-1), (8-2).

[Equations 8]

$$P_{target} = P_{sat\_sens} \frac{Q_{sens} - Q_{H2O\_out}}{Q_{H2O\_out}} \quad (8\text{-}1)$$

where:

$$P_{sat\_sens} = 10^{7.7406 - \frac{1657.46}{227.02 + T_{sens}}} \quad (8\text{-}2)$$

$P_{sat\_sens}$ denotes a saturated water vapor pressure at the water temperature $T_{sens}$ detected by the water temperature sensor 401 and Equation (8-2) is obtained based on Antoine equation.

In the above manner, the target pressure calculation block B201 calculates the target cathode pressure $P_{target}$ based on the target water discharge quantity $Q_{H2O\_out}$, the actual flow rate $Q_{sens}$ and the water temperature $T_{sens}$.

The target temperature calculation block B202 calculates a target temperature $T_{target}$ based on the target water discharge quantity $Q_{H2O\_out}$, a minimum cathode pressure $P_{min}$ and the flow rate $Q_{sens}$ detected by the cathode flow rate sensor 201. Specifically, the target temperature $T_{target}$ is calculated by the following Equations (9-1), (9-2). It should be noted that Equation (9-1) is obtained by the reverse of Antoine equation.

[Equations 9]

$$T_{target} = \frac{1657.46}{7.7406 - \log_{10} P_{sat\_target}} - 227.02 \quad (9\text{-}1)$$

where:

$$P_{sat\_target} = P_{min} \frac{Q_{H2O\_out}}{Q_{sens} + Q_{H2O\_out}} \quad (9\text{-}2)$$

$P_{sat\_target}$ is a target saturated water vapor pressure.

In the above manner, the target temperature calculation block B202 calculates the target temperature $T_{target}$ based on the target water discharge quantity $Q_{H2O\_out}$, the minimum cathode pressure $P_{min}$ and the flow rate $Q_{sens}$ detected by the cathode flow rate sensor 201.

The target flow rate calculation block B203 calculates a target cathode flow rate $Q_{target}$ based on the target water discharge quantity $Q_{H2O\_out}$, a maximum stack temperature $T_{max}$ and the minimum cathode pressure $P_{min}$ as shown in FIG. 9A when the target water discharge quantity $Q_{H2O\_out}$ decreases, i.e. in the case of wetting by increasing the wet state. Specifically, the target cathode flow rate $Q_{target}$ is calculated by the following Equations (10-1), (10-2).

[Equations 10]

$$Q_{target} = Q_{H2O\_out} \frac{P_{min} - P_{sat\_max}}{P_{sat\_max}} \quad (10\text{-}1)$$

where:

$$P_{sat\_max} = 10^{7.7406 - \frac{1657.46}{227.02 + T_{max}}} \quad (10\text{-}2)$$

Here, the maximum stack temperature $T_{max}$ is a stack temperature at the time of setting the fuel cell stack in a minimum wet state. As described above, the temperature of the fuel cell stack 10 is increased to decrease the wet state of the electrolyte membrane. It should be noted that a power generation failure may be caused by condensed water if the temperature of the fuel cell stack 10 is too low. On the other hand, if this temperature is too high, the deterioration of the fuel cell stack 10 is accelerated. Thus, the stack temperature at the time of setting the fuel cell stack in the minimum wet state is a highest stack temperature in a range where the performance of the fuel cell stack can be ensured, comprehensively considering these. Similarly, the minimum cathode pressure $P_{min}$ is a cathode pressure at the time of setting the fuel cell stack in the minimum wet state. As described above, the cathode pressure is decreased to decrease the wet state of the electrolyte membrane. It should be noted that performance may be deteriorated due to an insufficient pressure if the cathode pressure is too low. On the other hand, if the cathode pressure is too high, it may not be possible to realize by the compressor. Thus, the cathode pressure at the time of setting the fuel cell stack in the minimum wet state is a lowest cathode pressure in a range where the performance of the fuel cell stack can be ensured, comprehensively considering these. These are set according to the operating state of the fuel cell by an experiment in advance.

Further, the target flow rate calculation block B203 calculates the target cathode flow rate $Q_{target}$ based on a temperature (calculated value) calculated based on the target water discharge quantity $Q_{H2O\_out}$ and the stack temperature (maximum stack temperature $T_{max}$) and lower than the maximum stack temperature $T_{max}$, but higher than the water temperature $T_{sens}$ detected by the water temperature sensor 401 and the minimum cathode pressure $P_{min}$ as shown in FIG. 9B when the target water discharge quantity $Q_{H2O\_out}$ increases, i.e. at the time of drying by decreasing the wet state. This calculated value is obtained, considering the rotation speed of the water pump 43 (manipulation amount for manipulating the cooling water temperature) as in the first embodiment.

In the above manner, the target flow rate calculation block B203 calculates the target cathode flow rate $Q_{target}$.

Figure 10:
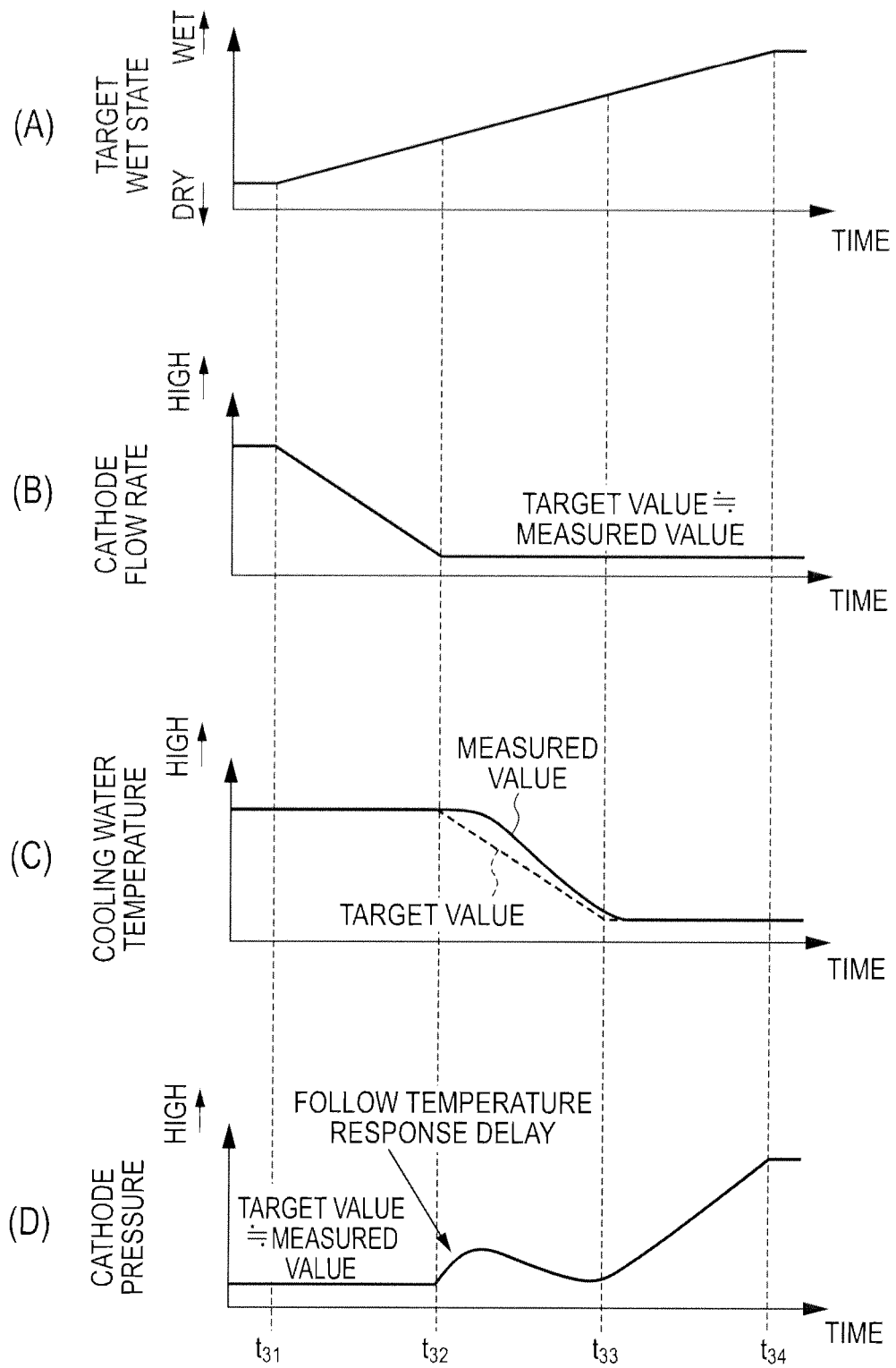

FIG. 10 are timing charts showing the operation of the wet state control device when the target wet state increases.

When the above control logic is executed, the wet state control device operates as follows when the target wet state increases.

When the target wet state increases at time t31, the wet state control device starts operating.

The target cathode flow rate $Q_{target}$ is set based on the target water discharge quantity $Q_{H2O\_out}$, the maximum stack temperature $T_{max}$ and the minimum cathode pressure $P_{min}$. The target temperature $T_{target}$ is set based on the target water discharge quantity $Q_{H2O\_out}$, the minimum cathode pressure $P_{min}$ and the actual flow rate $Q_{sens}$. The target cathode pressure $P_{target}$ is set based on the target water discharge quantity $Q_{H2O\_out}$, the actual flow rate $Q_{sens}$ and the actual water temperature $T_{sens}$.

Since being set based on the stack temperature (maximum stack temperature $T_{max}$) and the cathode pressure (minimum cathode pressure $P_{min}$) at the time of setting the minimum wet state, the target flow rate $Q_{target}$ is most likely to vary. Accordingly, the target flow rate $Q_{target}$ is first preferentially decreased. Then, the compressor 21 is controlled to realize this target flow rate $Q_{target}$. Then, the cathode flow rate decreases almost without any response delay.

If a complete adjustment is not possible only by changing the target flow rate $Q_{target}$, the target temperature $T_{target}$ starts varying at time t32. Specifically, a limit value (minimum cathode pressure $P_{min}$) is used to set the target temperature $T_{target}$. Further, the sensor detection value $Q_{sens}$ of the cathode flow rate regulated as described above is fed back. Thus, an amount unadjustable only by the cathode flow rate is adjusted by changing the temperature of the cooling water. It should be noted that the temperature of the cooling water is unlikely to vary and a response delay is likely to occur even if a target value is changed. Since the temperature of the cooling water is detected by the water temperature sensor 401 and fed back to determine the cathode pressure, a response delay of the cooling water temperature is complemented by the cathode pressure.

If a complete adjustment is not possible even if the target temperature $T_{target}$ is changed, the target cathode pressure $P_{target}$ starts varying at time t33. Specifically, since the flow rate $Q_{sens}$ detected by the cathode flow rate sensor 201 and the water temperature $T_{sens}$ detected by the water temperature sensor 401 are fed back to determine the cathode pressure, an amount unadjustable by changing the target flow rate $Q_{target}$ and the target temperature $T_{target}$ is complemented by the cathode pressure.

By this way, the target flow rate is first decreased and the rotation speed of the compressor 21 is decreased when the target wet state of the fuel cell is changed to increase the wet state. Subsequently, the target cooling water temperature is decreased and the three-way valve 42 is controlled. Finally, the target pressure is increased and the cathode pressure regulating valve 22 is closed. By doing so, the rotation speed of the compressor 21 is reduced as early as possible. As described above, power consumption increases to deteriorate fuel economy with an increase in the rotation speed of the compressor. In other words, power consumption is suppressed to improve fuel economy with a decrease in the rotation speed of the compressor. Since the rotation speed of the compressor 21 is reduced as early as possible in the present embodiment, fuel economy is improved.

Figure 11:
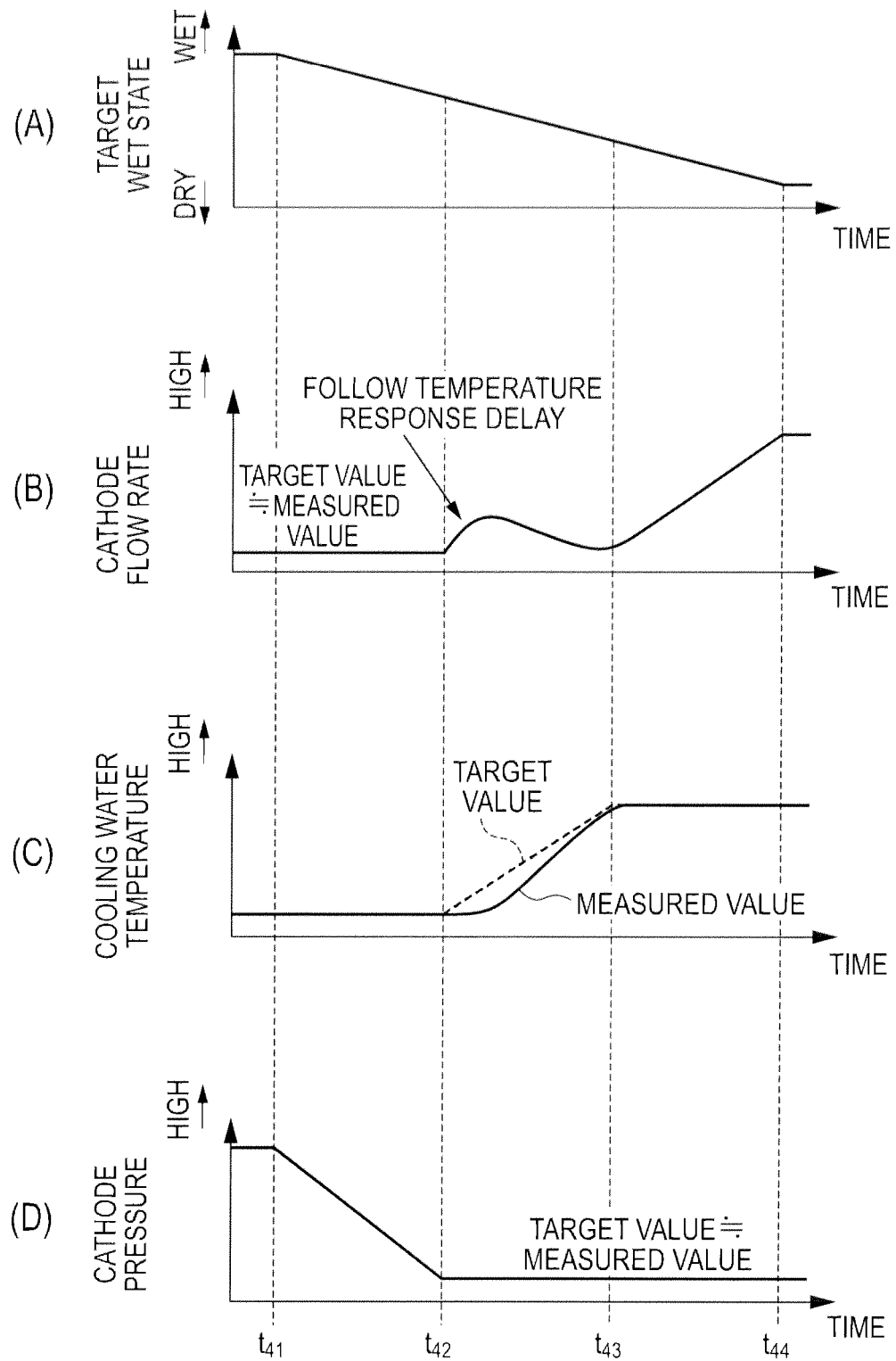

FIG. 11 are timing charts showing the operation of the wet state control device when the target wet state decreases.

Since an increase in the rotation speed of the compressor 21 is suppressed as much as possible in the above manner when the target wet state increases, power consumption is suppressed to improve fuel economy.

However, the wet state cannot be controlled as targeted in the above manner when the target wet state decreases. Specifically, since being set based on the stack temperature (maximum stack temperature $T_{max}$) and the cathode pressure (minimum cathode pressure $P_{min}$) at the time of setting the minimum wet state, the target flow rate $Q_{target}$ is unlikely to vary when the target wet state decreases.

If a complete adjustment is not possible only by changing the target cathode pressure $P_{target}$, the target flow rate $Q_{target}$ and the target temperature $T_{target}$ start varying at time t42. Temperature has poor responsiveness and is less likely to vary than flow rate. Conversely, flow rate varies earlier than temperature and cannot complement temperature. Thus, temperature deviates from a target, with result that the wet state cannot be controlled as targeted.

Contrary to this, in the present embodiment, the target flow rate calculation block B203 uses the temperature (calculated value) calculated based on the stack temperature (maximum stack temperature $T_{max}$) and lower than the maximum stack temperature $T_{max}$, but higher than the water temperature $T_{sens}$ detected by the water temperature sensor 401 when the target water discharge quantity $Q_{H2O\_out}$ increases, i.e. at the time of drying by decreasing the wet state.

By this way, a temperature higher than the water temperature $T_{sens}$ detected by the water temperature sensor 401 is constantly input to the target flow rate calculation block B203. Thus, the target wet state cannot be achieved at the flow rate calculated in the target flow rate calculation block B203. Thus, the target wet state is achieved at the temperature calculated by the target temperature calculation block B202 and the flow rate is varied to complement that temperature.

By doing so, the target pressure is first decreased and the cathode pressure regulating valve 22 is opened when the target wet state decreases. Subsequently, the target cooling water temperature is increased and the three-way valve 42 is controlled. Finally, the target flow rate is increased and the rotation speed of the compressor 21 is increased. By doing so, an increase in the rotation speed of the compressor 21 is suppressed as much as possible. Power consumption increases to deteriorate fuel economy with an increase in the rotation speed of the compressor. However, since an increase in the rotation speed of the compressor 21 is suppressed as much as possible in the present embodiment, power consumption is suppressed to improve fuel economy.

Third Embodiment

Figure 12A:
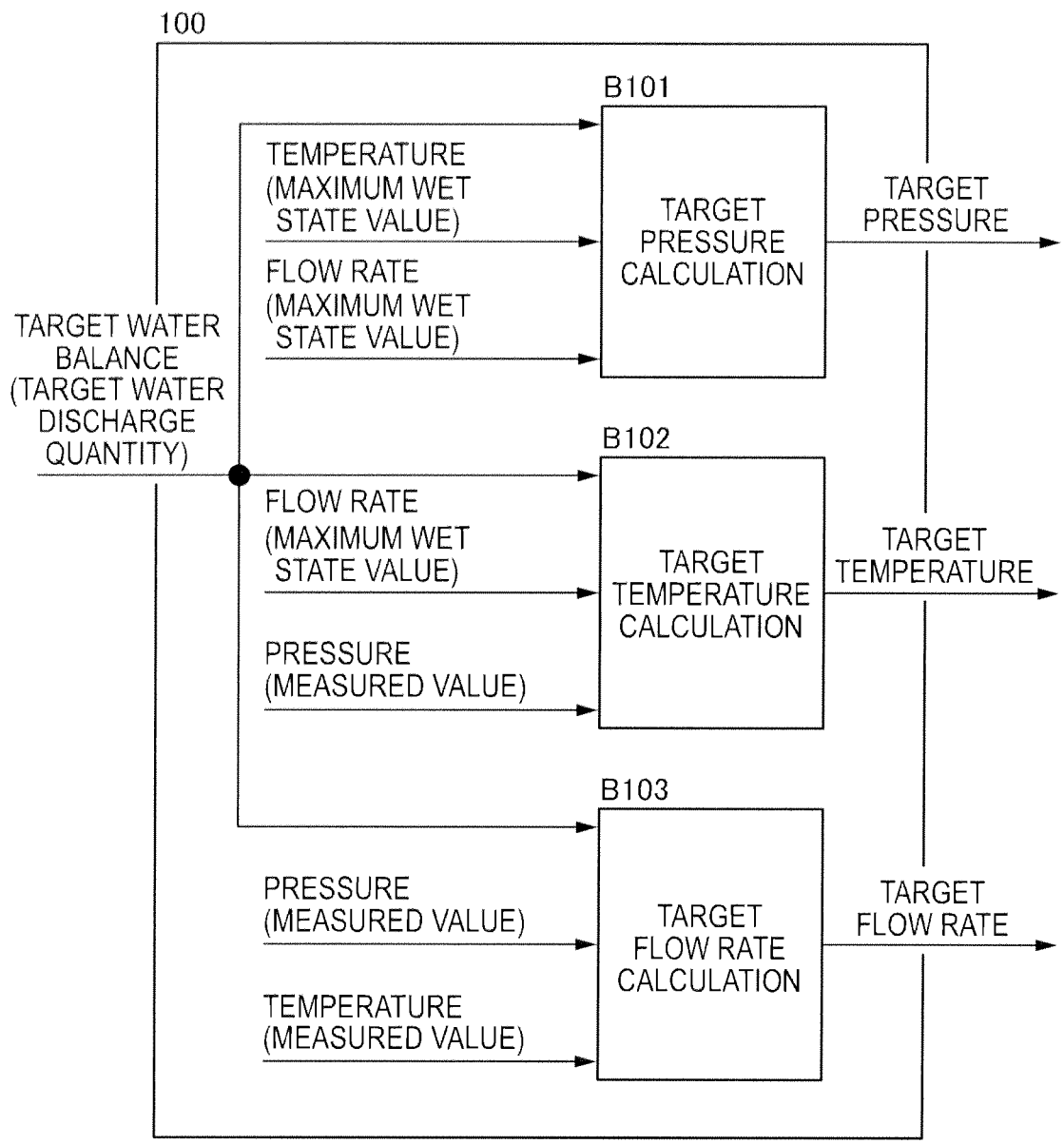
FIG. 12A is a block diagram showing functions relating to a control of a controller in a third embodiment of a wet state control device for fuel cell according to the present invention.
Figure 12B:
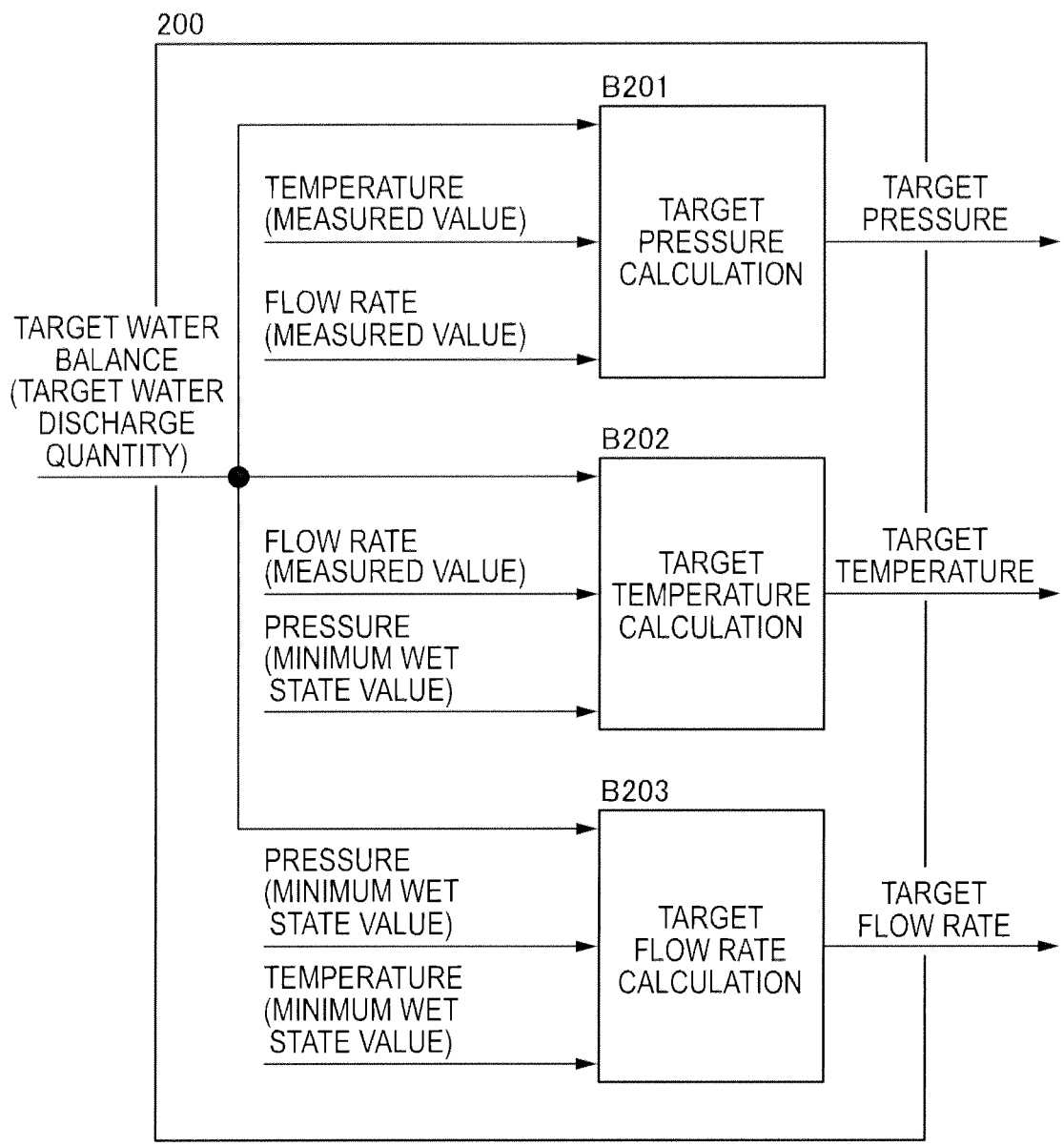
FIG. 12B is a block diagram showing functions relating to the control of the controller in the third embodiment of the wet state control device for fuel cell according to the present invention, FIG. 13 are timing charts showing the operation of the wet state control device when a target wet state decreases, FIG. 14 are timing charts showing the operation of the wet state control device when the target wet state increases.

FIGS. 12A and 12B are block diagrams showing functions relating to a control of a controller in a third embodiment of a wet state control device for fuel cell according to the present invention.

The wet state control device of the present embodiment includes a wet state decreasing unit 100 and a wet state increasing unit 200.

The wet state decreasing unit 100 is a control unit executed when the target water discharge quantity $Q_{H2O\_out}$ increases, i.e. when the wet state decreases. The wet state decreasing unit 100 includes a target pressure calculation block B101, a target temperature calculation block B102 and a target flow rate calculation block B103. It should be noted that the wet state decreasing unit 100 is not described in detail since being similar to a corresponding configuration of the first embodiment (FIG. 3). It should be noted that the target pressure calculation block B101 corresponds to the priority control unit as claimed, the target temperature calculation block B102 corresponds to the water temperature control unit as claimed, and the target flow rate calculation block B103 corresponds to the complementary control unit as claimed.

The wet state increasing unit 200 is a control unit executed when the target water discharge quantity $Q_{H2O\_out}$ decreases, i.e. when the wet state increases. The wet state increasing unit 200 includes a target flow rate calculation block B203, a target temperature calculation block B202 and a target pressure calculation block B201. It should be noted that these blocks are not described in detail since being similar to those of the second embodiment (FIG. 9A). It should be noted that the target pressure calculation block B201 corresponds to the complementary control unit as claimed, the target temperature calculation block B202 corresponds to the water temperature control unit as claimed, and the target flow rate calculation block B203 corresponds to the priority control unit as claimed.

Figure 13:
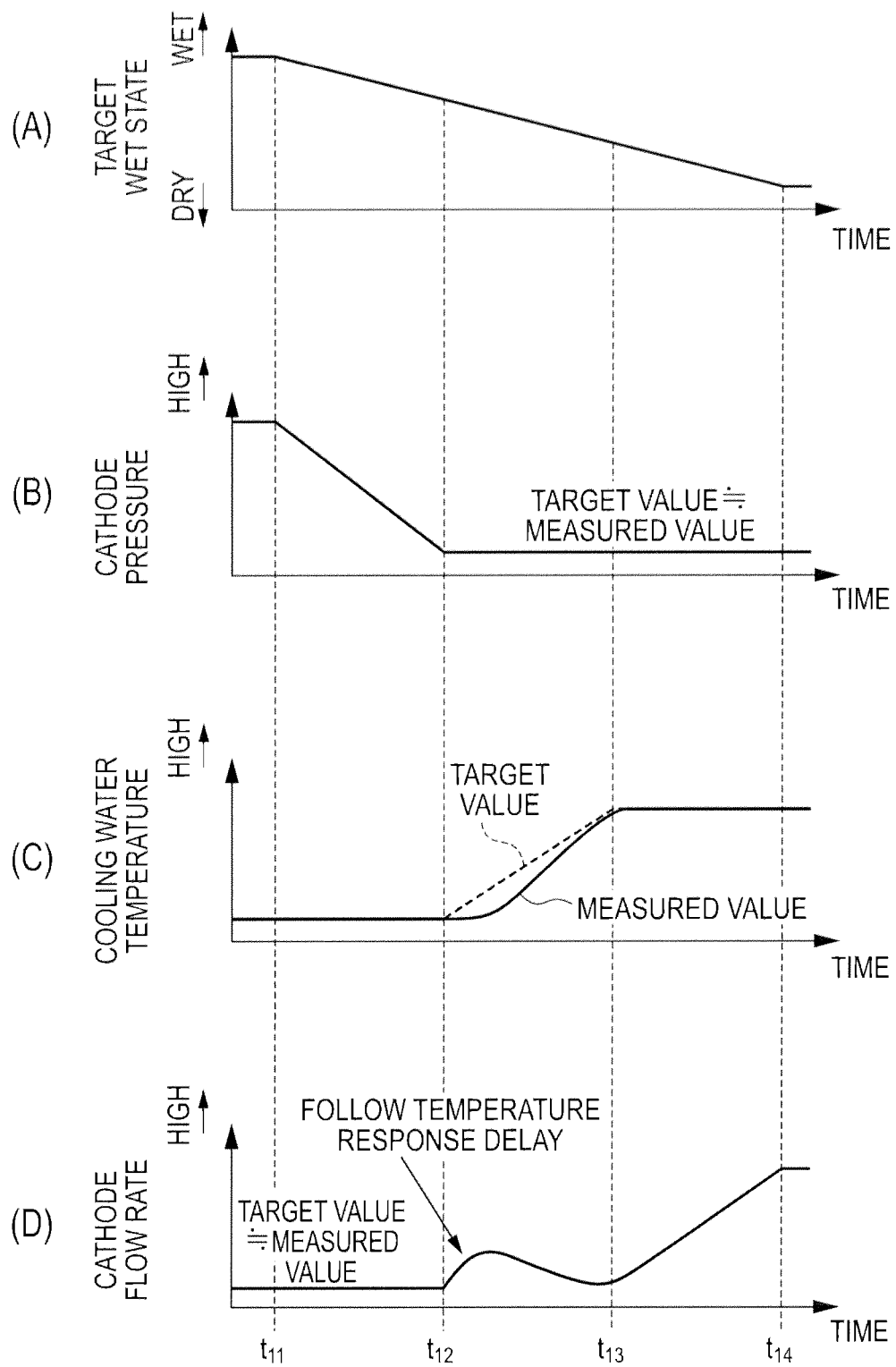

FIG. 13 are timing charts showing the operation of the wet state control device when the target wet state decreases.

When the above control logic is executed, the wet state control device operates as follows when the target wet state decreases.

When the target wet state decreases at time t11, the wet state decreasing unit 100 of the wet state control device starts operating.

A target pressure $P_{target}$ is set based on a target water discharge quantity $Q_{H2O\_out}$, a minimum stack temperature $T_{min}$ and a minimum cathode flow rate $Q_{min}$. A target temperature $T_{target}$ is set based on the target water discharge quantity $Q_{H2O\_out}$, an actual pressure $P_{sens}$ and the minimum cathode flow rate $Q_{min}$. A target cathode flow rate $Q_{target}$ is set based on the target water discharge quantity $Q_{H2O\_out}$, the actual pressure $P_{sens}$ and an actual water temperature $T_{sens}$.

Since being set based on the stack temperature (minimum stack temperature $T_{min}$) and the cathode flow rate (minimum cathode flow rate $Q_{min}$) at the time of setting a maximum wet state, the target pressure $P_{target}$ is most likely to vary. Accordingly, the target pressure $P_{target}$ is first preferentially decreased. Then, the cathode pressure regulating valve 22 is controlled to realize this target pressure $P_{target}$. Then, the cathode pressure decreases almost without any response delay.

If a complete adjustment is not possible only by changing the target pressure $P_{target}$, the target temperature $T_{target}$ starts varying at time t12. Specifically, a limit value (minimum cathode flow rate is used to set the target temperature $T_{target}$. Further, the sensor detection value $P_{sens}$ of the cathode pressure regulated as described above is fed back. Thus, an amount unadjustable only by the cathode pressure is adjusted by changing the temperature of the cooling water. It should be noted that the temperature of the cooling water is unlikely to vary and a response delay is likely to occur even if a target value is changed. Since the temperature of the cooling water is detected by the water temperature sensor 401 and fed back to determine the cathode flow rate, a response delay of the cooling water temperature is complemented by the cathode flow rate.

If a complete adjustment is not possible even if the target temperature $T_{target}$ is changed, the target cathode flow rate $Q_{target}$ starts varying at time t13. Specifically, since the pressure $P_{sens}$ detected by the cathode pressure sensor 202 and the water temperature $T_{sens}$ detected by the water temperature sensor 401 are fed back to determine the cathode flow rate, an amount unadjustable by changing the target pressure $P_{target}$ and the target temperature $T_{target}$ is complemented by the cathode flow rate.

Figure 14:
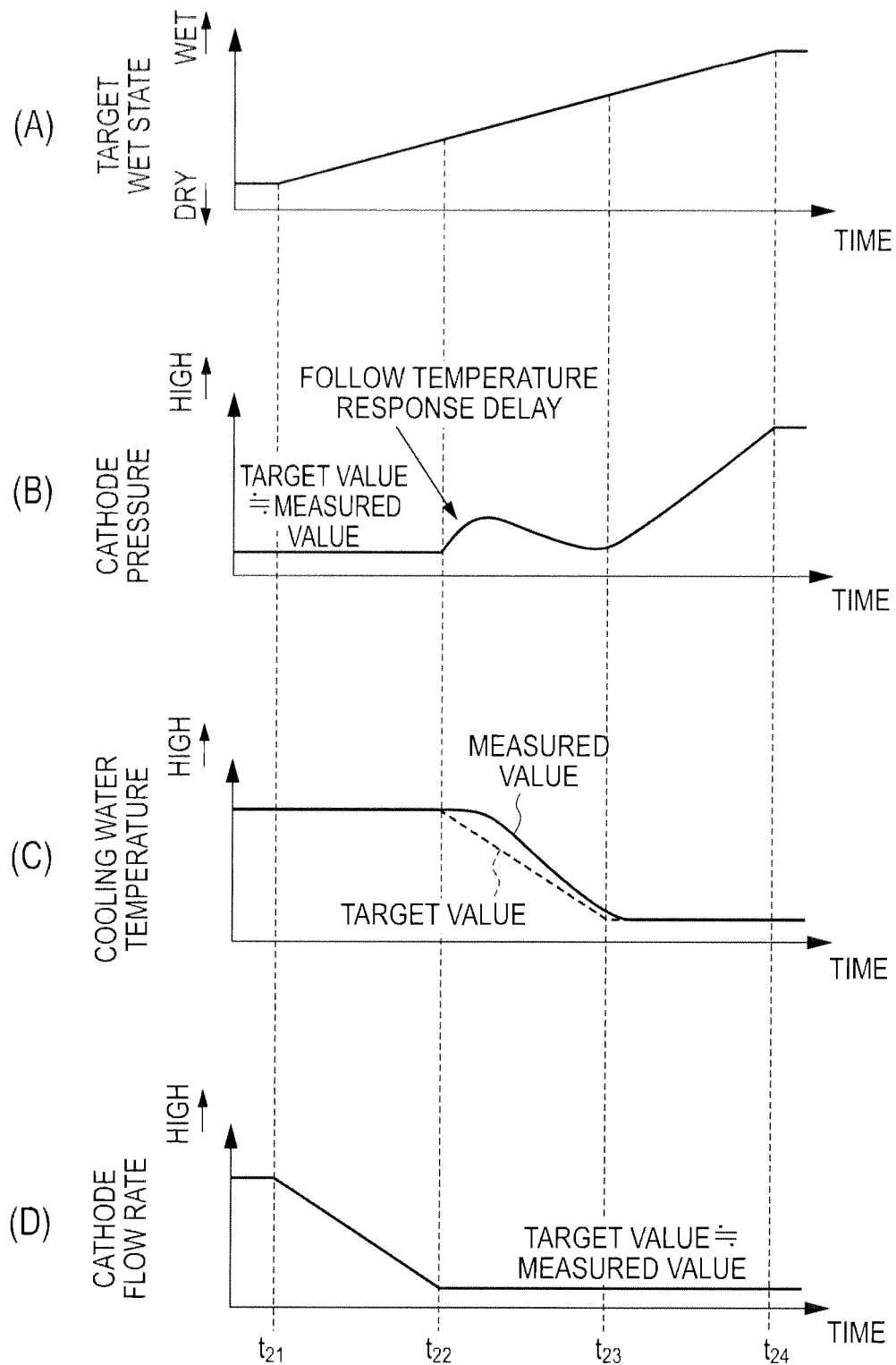

FIG. 14 are timing charts showing the operation of the wet state control device when the target wet state increases.

When the target wet state increases at time t21, the wet state increasing unit 200 of the wet state control device starts operating.

The target cathode flow rate $Q_{target}$ is set based on the target water discharge quantity $Q_{H2O\_out}$, the maximum stack temperature $T_{max}$ and the minimum cathode pressure $P_{min}$. The target temperature $T_{target}$ is set based on the target water discharge quantity $Q_{H2O\_out}$, the minimum cathode pressure $P_{min}$ and the actual flow rate $Q_{sens}$. The target cathode pressure $P_{target}$ is set based on the target water discharge quantity $Q_{H2O\_out}$, the actual flow rate $Q_{sens}$ and the actual water temperature $T_{sens}$.

Since being set based on the stack temperature (maximum stack temperature $T_{max}$) and the cathode pressure (minimum cathode pressure $P_{min}$) at the time of setting a minimum wet state, the target flow rate $Q_{target}$ is most likely to vary. Accordingly, the target flow rate $Q_{target}$ is first preferentially decreased. Then, the compressor 21 is controlled to realize this target flow rate $Q_{target}$. Then, the cathode flow rate decreases almost without any response delay.

If a complete adjustment is not possible only by changing the target flow rate $Q_{target}$, target temperature $T_{target}$ starts varying at time t22. Specifically, a limit value (minimum cathode pressure $P_{min}$) is used to set the target temperature $T_{target}$. Further, the sensor detection value $Q_{sens}$ of the cathode flow rate regulated as described above is fed back. Thus, an amount unadjustable only by the cathode flow rate is adjusted by changing the temperature of the cooling water. It should be noted that the temperature of the cooling water is unlikely to vary and a response delay is likely to occur even if a target value is changed. Since the temperature of the cooling water is detected by the water temperature sensor 401 and fed back to determine the cathode pressure, a response delay of the cooling water temperature is complemented by the cathode pressure.

If a complete adjustment is not possible even if the target temperature $T_{target}$ is changed, the target cathode pressure $P_{target}$ starts varying at time t23. Specifically, since the flow rate $Q_{sens}$ detected by the cathode flow rate sensor 201 and the water temperature $T_{sens}$ detected by the water temperature sensor 401 are fed back to determine the cathode pressure, an amount unadjustable by changing the target flow rate $Q_{target}$ and the target temperature $T_{target}$ is complemented by the cathode pressure.

According to the present embodiment, the target pressure is first decreased and the cathode pressure regulating valve 22 is opened when the target wet state of the fuel cell is changed to decrease the wet state. Subsequently, the target cooling water temperature is increased and the three-way valve 42 is controlled. Finally, the target flow rate is increased and the rotation speed of the compressor 21 is increased. By doing so, an increase in the rotation speed of the compressor 21 is suppressed as much as possible. Power consumption increases to deteriorate fuel economy with an increase in the rotation speed of the compressor. However, since an increase in the rotation speed of the compressor 21 is suppressed as much as possible in the present embodiment, power consumption is suppressed to improve fuel economy.

Further, according to the present embodiment, the target flow rate is first decreased and the rotation speed of the compressor 21 is decreased when the target wet state of the fuel cell is changed to increase the wet state. Subsequently, the target cooling water temperature is decreased and the three-way valve 42 is controlled. Finally, the target pressure is increased and the cathode pressure regulating valve 22 is closed. By doing so, the rotation speed of the compressor 21 is reduced as early as possible. As described above, power consumption increases to deteriorate fuel economy with an increase in the rotation speed of the compressor. In other words, power consumption is suppressed to improve fuel economy with a decrease in the rotation speed of the compressor. Since the rotation speed of the compressor 21 is reduced as early as possible in the present embodiment, fuel economy is improved.

Furthermore, in the present embodiment, the control logic of the target pressure calculation block B101 and that of the target pressure calculation block B201 are the same. Further, the control logic of the target temperature calculation block B102 and that of the target temperature calculation block B202 are the same. Furthermore, the control logic of the target flow rate calculation block B103 and that of the target flow rate calculation block B203 are the same. By changing only signals to be input to these control blocks, the fuel cell is dried by decreasing the wet state of the fuel cell while being wetted by increasing the wet state of the fuel cell. In this way, the wet state of the fuel cell can be controlled by changing a control priority of the pressure, the temperature and the flow rate only by changing input values while having the same control logics.

Fourth Embodiment

Figure 15A:
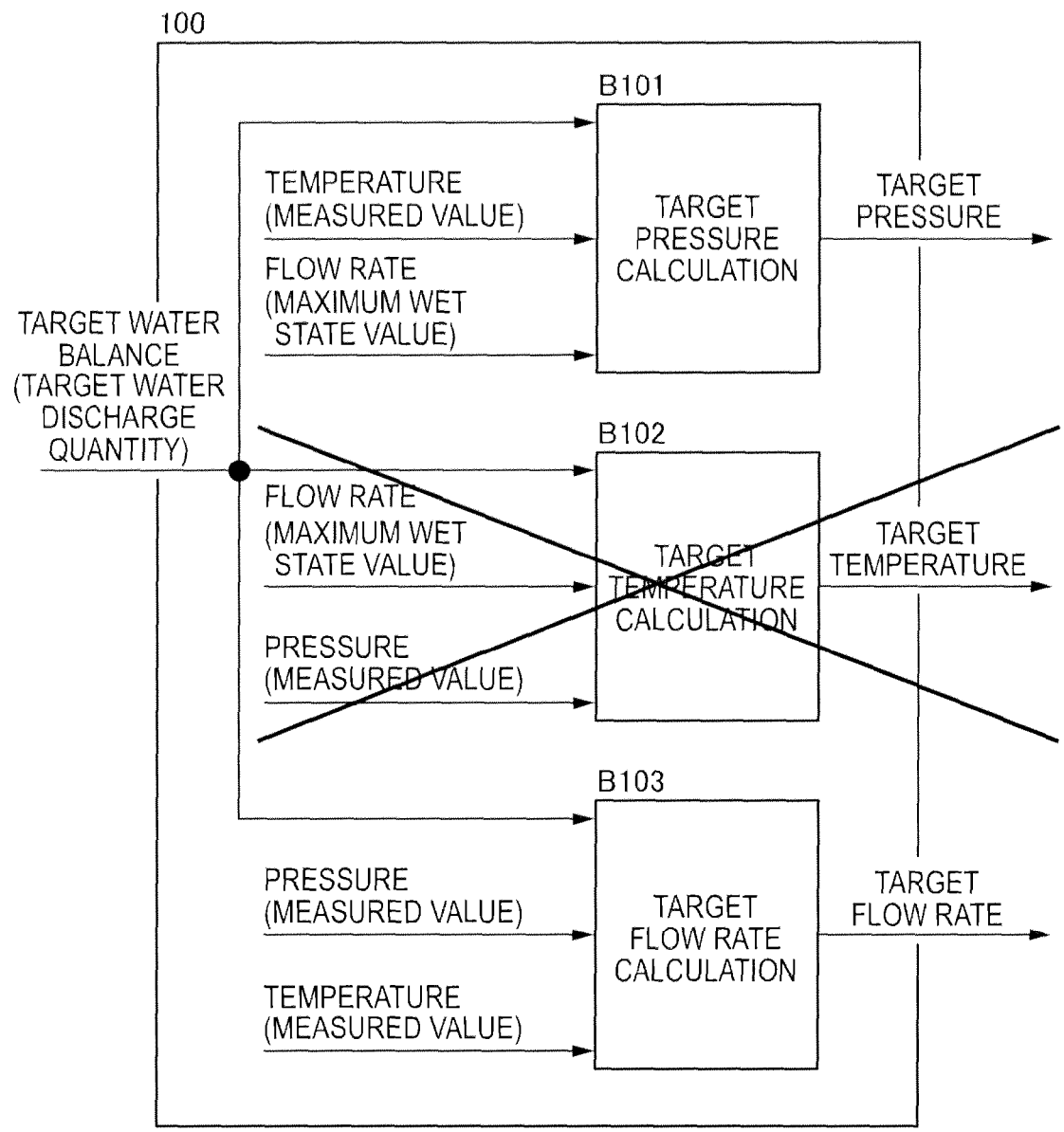
FIG. 15A is a block diagram showing functions relating to a control of a controller in a fourth embodiment of a wet state control device for fuel cell according to the present invention.
Figure 15B:
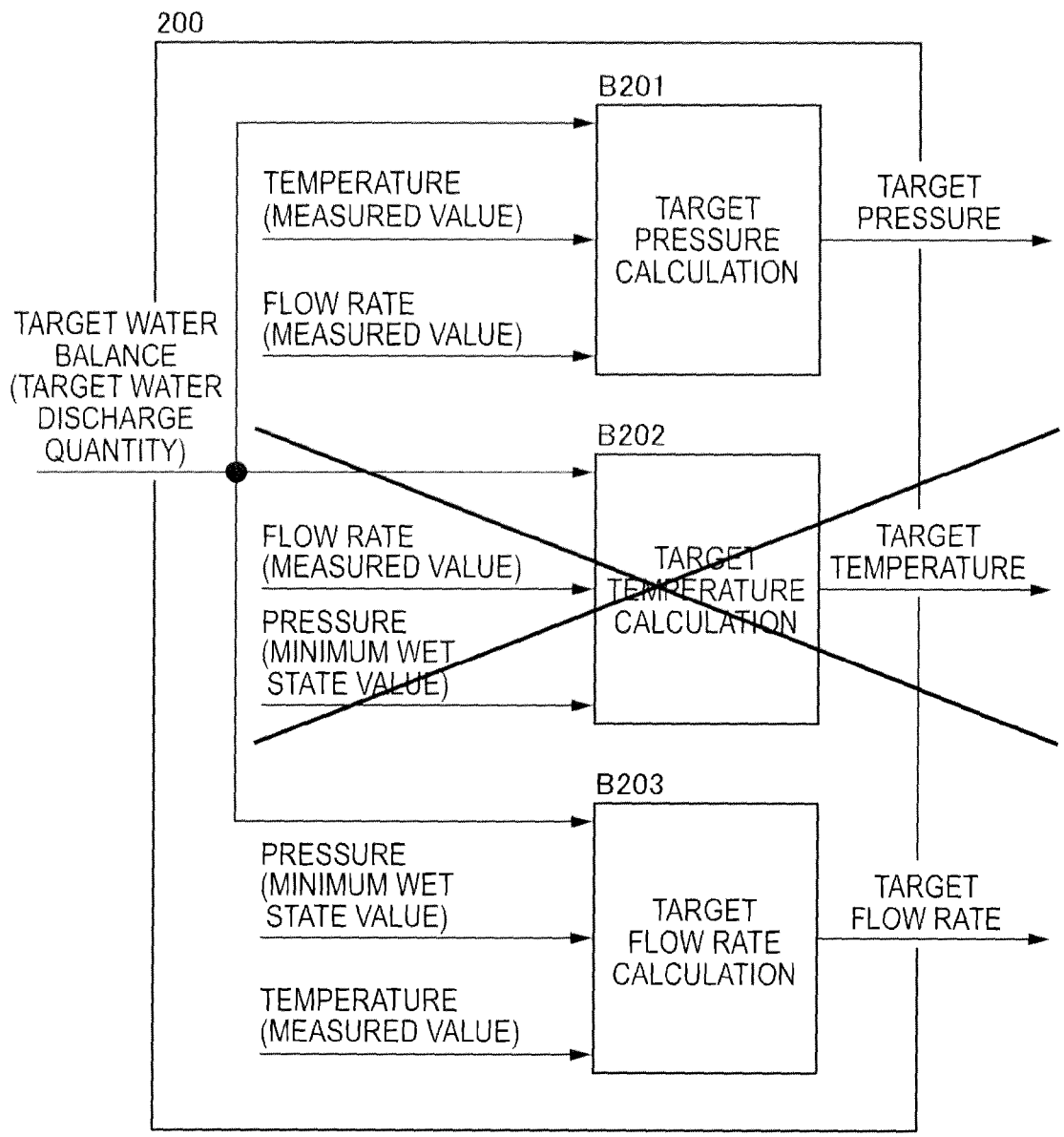
FIG. 15B is a block diagram showing functions relating to the control of the controller in the fourth embodiment of the wet state control device for fuel cell according to the present invention.

FIGS. 15A and 15B are block diagrams showing functions relating to a control of a controller in a fourth embodiment of a wet state control device for fuel cell according to the present invention.

Depending on an operation mode, the three-way valve 42 is not controlled. Further, there is a possibility that the three-way valve 42 cannot be controlled due to a certain trouble. At times like this, the target pressure calculation block B101 calculates the target pressure $P_{target}$ using the water temperature $T_{sens}$ detected by the water temperature sensor 401 instead of the minimum stack temperature $T_{min}$. Further, the target flow rate calculation block B203 calculates the target cathode flow rate $Q_{target}$ using the water temperature $T_{sens}$ detected by the water temperature sensor 401 instead of the maximum stack temperature $T_{max}$.

By doing as in the present embodiment, an operation mode in which the three-way valve 42 is not controlled and a case where the three-way valve 42 cannot be controlled due to a certain trouble can be dealt with. Further, also in the present embodiment, the target pressure is first decreased and the cathode pressure regulating valve 22 is opened when the target wet state of the fuel cell is changed to decrease the wet state. Subsequently, the target flow rate is increased and the rotation speed of the compressor 21 is increased. This causes an increase in the rotation speed of the compressor 21 to be suppressed as much as possible, whereby power consumption is suppressed to improve fuel economy. Further, the target flow rate is first decreased and the rotation speed of the compressor 21 is decreased when the target wet state of the fuel cell is changed to increase the wet state. Subsequently, the target pressure is increased and the cathode pressure regulating valve 22 is closed. This causes the rotation speed of the compressor 21 to be reduced as early as possible, whereby power consumption is suppressed to improve fuel economy.

Fifth Embodiment

Figure 16A:
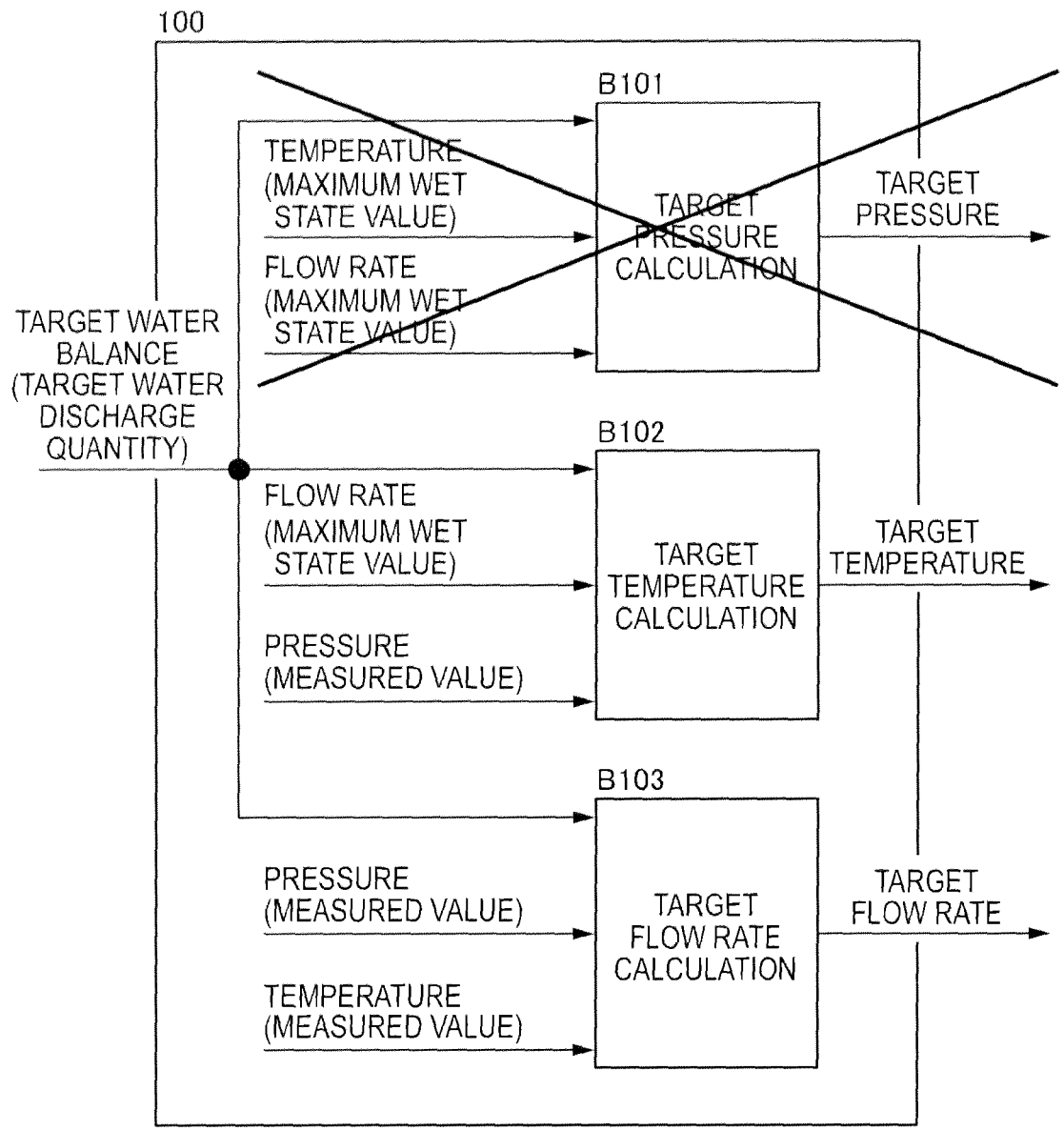
FIG. 16A is a block diagram showing functions relating to a control of a controller in a fifth embodiment of a wet state control device for fuel cell according to the present invention.
Figure 16B:
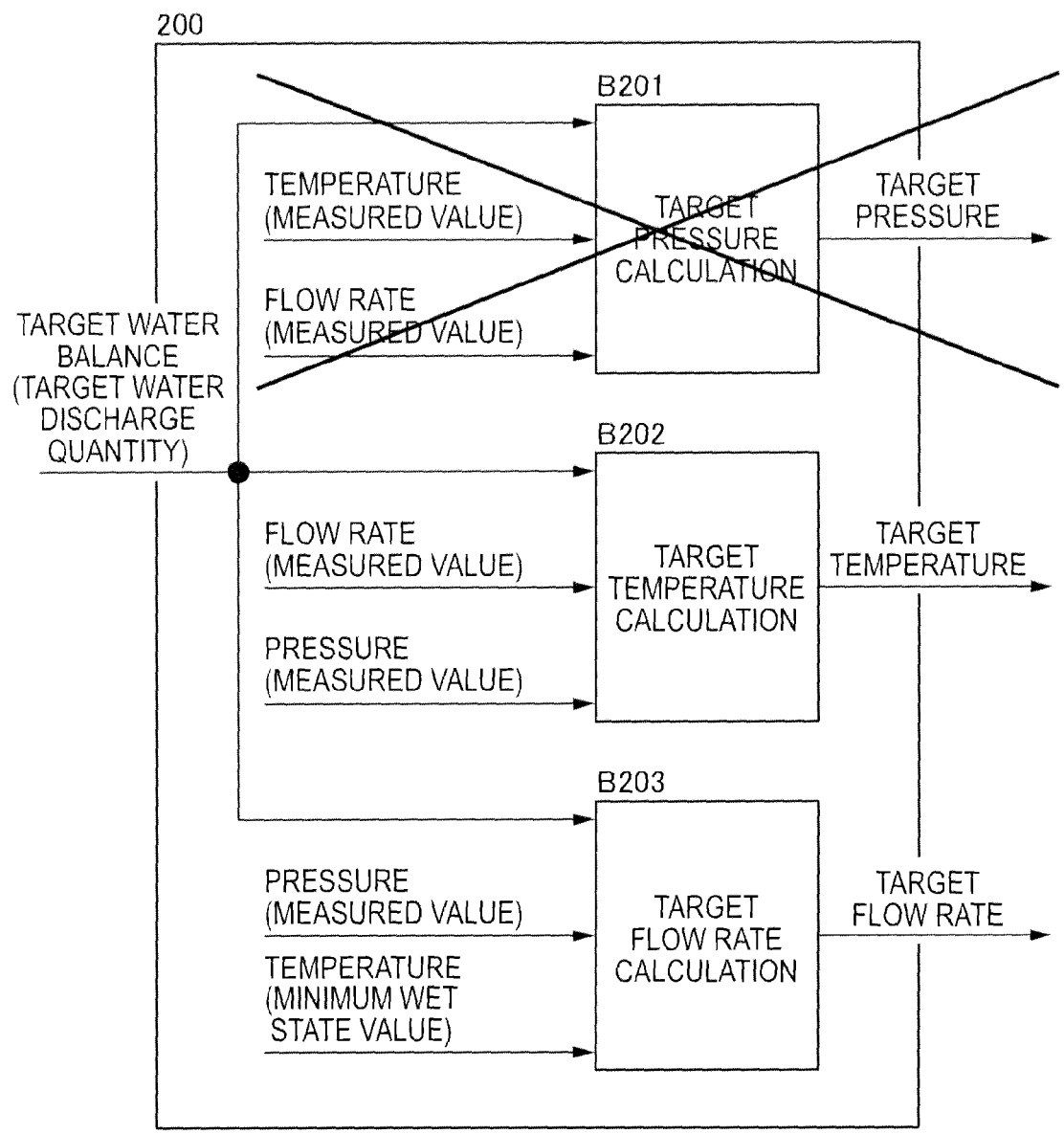
FIG. 16B is a block diagram showing functions relating to the control of the controller in the fifth embodiment of the wet state control device for fuel cell according to the present invention.

FIGS. 16A and 16B are block diagrams showing functions relating to a control of a controller in a fifth embodiment of a wet state control device for fuel cell according to the present invention.

Depending on an operation mode, the cathode pressure regulating valve 22 is not controlled. Further, there is a possibility that the cathode pressure regulating valve 22 cannot be controlled due to a certain trouble. At times like this, the target flow rate calculation block B203 calculates the target cathode flow rate $Q_{target}$ using the pressure detected by the cathode pressure sensor 202 instead of the minimum cathode pressure $P_{min}$. Further, the target temperature calculation block B202 calculates the target temperature $T_{target}$ using the pressure $P_{sens}$ detected by the cathode pressure sensor 202 instead of the minimum cathode pressure $P_{min}$.

By doing as in the present embodiment, an operation mode in which the cathode pressure regulating valve 22 is not controlled and a case where the cathode pressure regulating valve 22 cannot be controlled due to a certain trouble can be dealt with. Further, also in the present embodiment, the target cooling water temperature is first increased and the three-way valve 42 is opened when the target wet state of the fuel cell is changed to decrease the wet state. Subsequently, the target flow rate is increased and the rotation speed of the compressor 21 is increased. This causes an increase in the rotation speed of the compressor 21 to be suppressed as much as possible, whereby fuel economy is improved. Further, the target flow rate is first decreased and the rotation speed of the compressor 21 is decreased when the target wet state of the fuel cell is changed to increase the wet state. Subsequently, the target cooling water temperature is decreased and the three-way valve 42 is controlled. This causes the rotation speed of the compressor 21 to be reduced as early as possible, whereby fuel economy is improved.

Sixth Embodiment

Figure 17A:
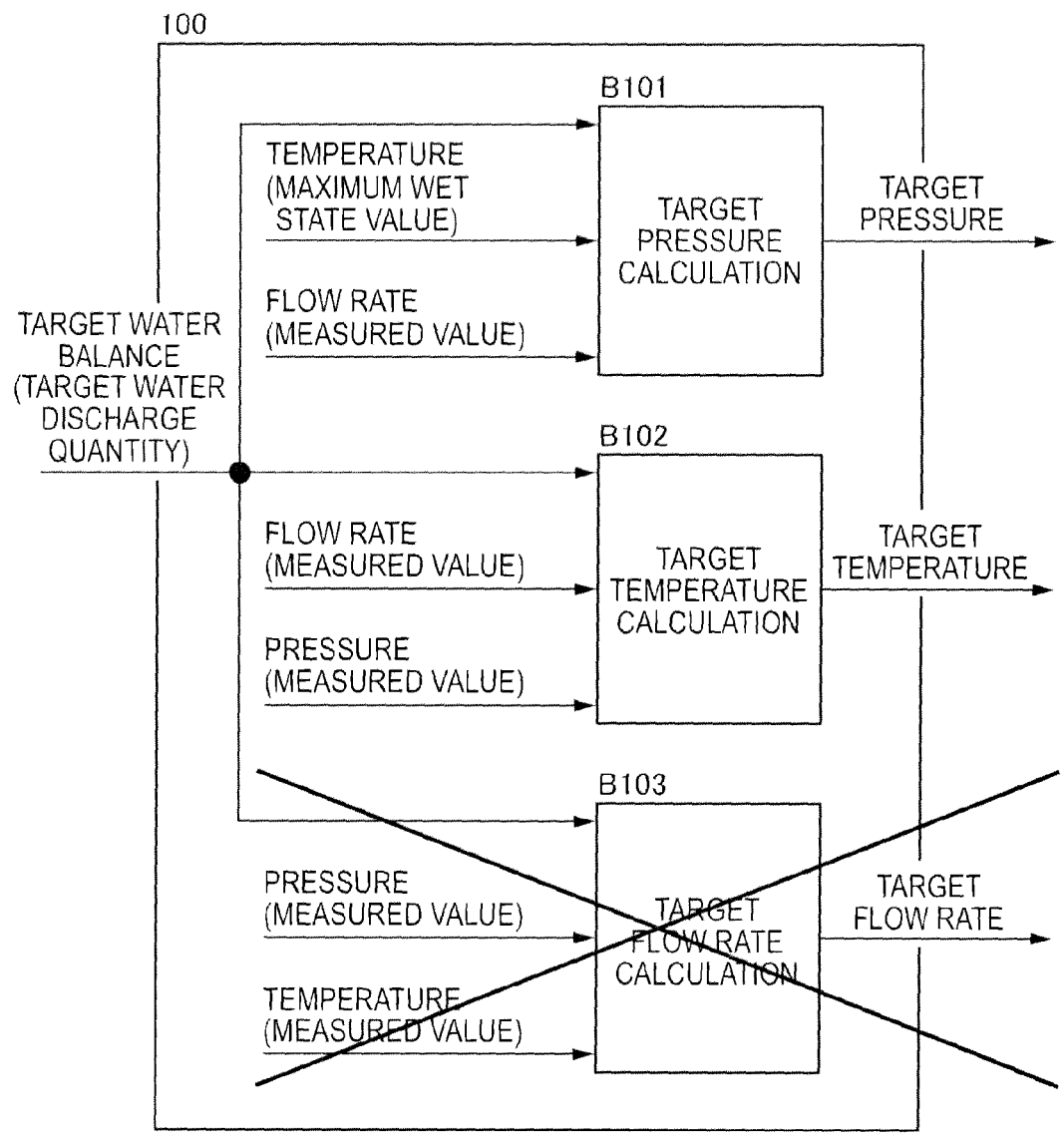
FIG. 17A is a block diagram showing functions relating to a control of a controller in a sixth embodiment of a wet state control device for fuel cell according to the present invention.
Figure 17B:
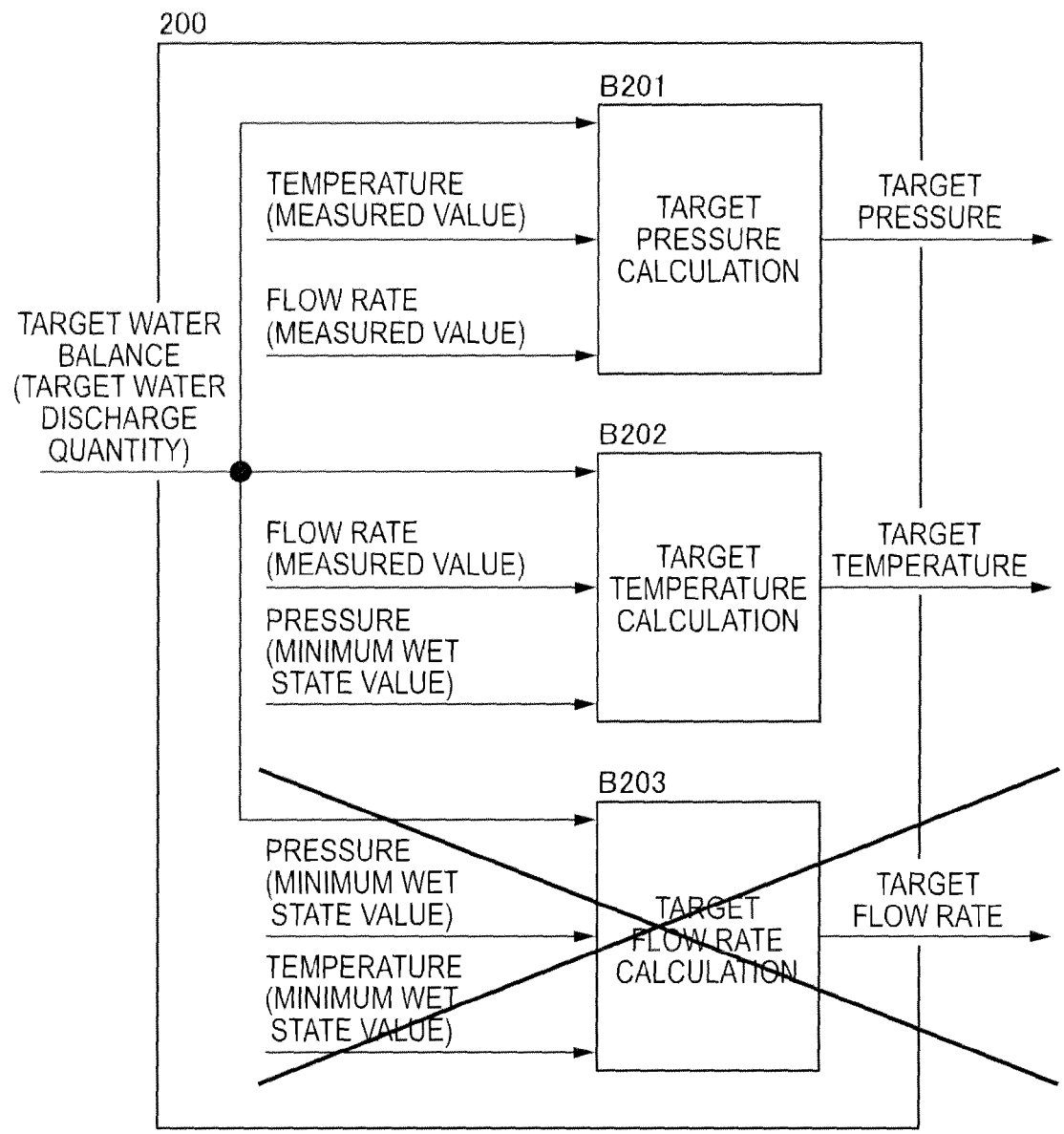
FIG. 17B is a block diagram showing functions relating to the control of the controller in the sixth embodiment of the wet state control device for fuel cell according to the present invention.

FIGS. 17A and 17B are block diagrams showing functions relating to a control of a controller in a sixth embodiment of a wet state control device for fuel cell according to the present invention.

Depending on an operation mode, the compressor 21 is not controlled. Further, there is a possibility that the compressor 21 cannot be controlled due to a certain trouble. At times like this, the target pressure calculation block B101 calculates the target cathode pressure $P_{target}$ using the flow rate $Q_{sens}$ detected by the cathode flow rate sensor 201 instead of the minimum cathode flow rate $Q_{min}$. Further, the target temperature calculation block B102 calculates the target temperature $T_{target}$ using the flow rate $Q_{sens}$ detected by the cathode flow rate sensor 201 instead of the minimum cathode flow rate $Q_{min}$.

By doing as in the present embodiment, an operation mode in which the compressor 21 is not controlled and a case where the compressor 21 cannot be controlled due to a certain trouble can be dealt with.

Although the embodiments of the present invention have been described, the above embodiments are only an illustration of some application examples of the present invention and the technical scope of the present invention is not limited to the specific configurations of the above embodiments.

For example, although the rotation speed of the water pump 43 is illustrated as the manipulation amount for manipulating the cooling water temperature, there is no limitation to this. The manipulation amount may be an opening of the three-way valve 42 or the rotation speed of the cooling fan 410.

Further, also in the second embodiment, the temperature $T_{coolant}$ may be calculated, considering the manipulation amount for manipulating the cooling water temperature as in the first embodiment.

Furthermore, in addition to that, the above embodiments may be appropriately combined.

Further, the wet state of the fuel cell may be water balance of the fuel cell (for example, water balance is defined to be: "water balance=water to be produced−water to be discharged"), may be resistance of the electrolyte membrane of the fuel cell or may be another indicator indicating the wet state of the fuel cell.

Furthermore, the temperature of the fuel cell itself or the temperature of air may be used instead of the temperature of the cooling water.

Furthermore, in each of the above embodiments, the stack temperature (minimum stack temperature $T_{min}$) and the cathode flow rate (minimum cathode flow rate $Q_{min}$) at the time of setting the maximum wet state are used in the target pressure calculation block B101 when the target pressure $P_{target}$ is set. The cathode flow rate (minimum cathode flow rate $Q_{min}$) at the time of setting the minimum wet state is used in the target temperature calculation block B202 when the target temperature $T_{target}$ is set. The stack temperature (maximum stack temperature $T_{max}$) and the cathode pressure (minimum cathode pressure $P_{min}$) at the time of setting the minimum wet state are used in the target flow rate calculation block B203 when the target flow rate $Q_{target}$ is set. If the limit values (maximum values, minimum values) are used in this way, a largest effect is achieved. However, values smaller than the maximum values and those larger than the minimum values may also be used. Even with such setting, a reasonable effect is achieved.

This application claims priorities of Japanese Patent Application No. 2011-126109 filed with the Japan Patent Office on Jun. 6, 2011 and Japanese Patent Application No. 2011-165322 filed with the Japan Patent Office on Jul. 28, 2011, all the contents of which are hereby incorporated by reference.

The invention claimed is:

1. A wet state control device configured to control a wet state of a membrane in a fuel cell, the wet state control device comprising:
   a priority control unit configured to control either one of a pressure or a flow rate of cathode gas when the wet state of the membrane is adjusted;
   a water temperature control unit configured to control a temperature of cooling water when the wet state of the membrane is not completely adjustable by a control of the priority control unit; and
   a complementary control unit configured to control the other of the pressure or the flow rate of the cathode gas to complement a response delay of the water temperature control unit;
   wherein the fuel cell is dried by decreasing the wet state of the membrane, and during the drying:
      the priority control unit decreases the pressure of the cathode gas;
      the water temperature control unit increases the temperature of the cooling water when the wet state of the membrane is not completely adjustable by the control of the priority control unit; and the complementary control unit controls the flow rate of the cathode gas to complement the response delay of the water temperature control unit.

2. The wet state control device according to claim 1, wherein the fuel cell is dried by decreasing the wet state of the membrane, and during the drying:
the priority control unit decreases the pressure of the cathode gas based on a flow rate of the cathode gas that is to be supplied when the membrane is set in a wetter state than a present wet state and the temperature of the cooling water when the membrane is set in a wetter state than the present wet state;
the water temperature control unit increases the temperature of the cooling water based on an actual pressure of the cathode gas and the flow rate of the cathode gas that is to be supplied when the wetter state than the present wet state is set; and
the complementary control unit controls the flow rate of the cathode gas based on the actual pressure of the cathode gas and an actual temperature of the cooling water.

3. The wet state control device according to claim 2, wherein:
the flow rate of the cathode gas that is to be supplied when the wetter state than the present wet state is set is a lowest flow rate in a range where the performance of the fuel cell is ensured; and
the temperature of the cooling water that is to be supplied when the wetter state than the present wet state is set is a lowest temperature in a range where the performance of the fuel cell is ensured.

4. The wet state control device according to claim 2, wherein:
the priority control unit uses the actual temperature of the cooling water instead of the temperature of the cooling water supplied when the wetter state than the present wet state is set if the water temperature control unit is not operating and the fuel cell is dried by decreasing the wet state of the membrane.

5. The wet state control device according to claim 2, wherein:
the priority control unit and the water temperature control unit use an actual flow rate of the cathode gas instead of the flow rate of the cathode gas supplied when the wetter state than the present wet state is set if the complementary control unit is not operating and the fuel cell is dried by decreasing the wet state of the membrane.

6. The wet state control device according to claim 1, wherein the fuel cell is dried by decreasing the wet state of the membrane, and during the drying:
the priority control unit decreases the pressure of the cathode gas based on an actual flow rate of the cathode gas and an actual temperature of the cooling water;
the water temperature control unit increases the temperature of the cooling water based on the actual flow rate of the cathode gas and a pressure of the cathode gas supplied when the membrane is set in a drier state than a present wet state; and
the complementary control unit controls the flow rate of the cathode gas based on a pressure of the cathode gas supplied when the membrane is set in the drier state than the present wet state and a temperature between a temperature of the cooling water supplied when the membrane is set in the drier state than the present wet state and an actual temperature of the cooling water.

7. The wet state control device according to claim 6, wherein:
the pressure of the cathode gas supplied when the drier state than the present wet state is set is a lowest pressure in a range where the performance of the fuel cell is ensured; and
the temperature of the cooling water supplied when the drier state than the present wet state is set is a highest temperature in a range where the performance of the fuel cell is ensured.

* * * * *